US009686581B2

(12) United States Patent
Cormican et al.

(10) Patent No.: US 9,686,581 B2
(45) Date of Patent: Jun. 20, 2017

(54) SECOND-SCREEN TV BRIDGE

(71) Applicant: Cisco Technology, Inc., San Jose, CA (US)

(72) Inventors: Neil Cormican, London (GB); James Walker, Kings Worthy (GB); Ronnie Dan, Modiin (IL)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/316,642

(22) Filed: Jun. 26, 2014

(65) Prior Publication Data
US 2015/0128179 A1    May 7, 2015

Related U.S. Application Data

(60) Provisional application No. 61/901,383, filed on Nov. 7, 2013.

(51) Int. Cl.
*G06F 13/00* (2006.01)
*H04N 5/445* (2011.01)
(Continued)

(52) U.S. Cl.
CPC ....... *H04N 21/4316* (2013.01); *G06F 3/0412* (2013.01); *G06F 3/0484* (2013.01);
(Continued)

(58) Field of Classification Search
CPC ......... H04N 21/4316; H04N 21/23424; H04N 21/4122; H04N 21/4143; H04N 21/42209; H04N 21/42224; H04N 21/4227; H04N 21/44222; H04N 21/47205; H04N 21/4784; H04N 21/4126; H04N 21/4222; H04N 21/4307; H04N 21/47217; H04N 21/482; H04N 21/4788; H04N 21/812
See application file for complete search history.

(56) References Cited

U.S. PATENT DOCUMENTS

2003/0035075 A1 * 2/2003 Butler et al. ............... 348/734
2013/0326583 A1 * 12/2013 Freihold et al. ............ 726/3

OTHER PUBLICATIONS

Zeebox.com, copyright 2012 <https://web.archive.org/web/20130609083253/http://zeebox.com/>.
(Continued)

*Primary Examiner* — Yassin Alata
(74) *Attorney, Agent, or Firm* — Polsinelli LLP

(57) ABSTRACT

A set top box can provide coordinated graphical user interfaces on a plurality of devices. The set top box can output first media content to a primary display (a television) and can output second media content to a second-screen device (a tablet). The primary display can display a video stream associated with the first media content. The second-screen device can display a video stream associated with the second media content. The video stream of the second media content can be displayed in a video display area on the second-screen device. The outputted video streams can be associated with the same content and can be substantially synchronized. The second application can receive user gestures on a touchscreen of the second-screen device to control the video stream displayed on the primary display. As a result, the second-screen device acts as a bridge to affect the displayed video stream on the primary display.

20 Claims, 18 Drawing Sheets

(51) Int. Cl.
| | |
|---|---|
| H04N 21/431 | (2011.01) |
| G06F 3/0481 | (2013.01) |
| G06F 3/0484 | (2013.01) |
| H04L 12/24 | (2006.01) |
| G06F 3/041 | (2006.01) |
| H04N 21/234 | (2011.01) |
| H04N 21/41 | (2011.01) |
| H04N 21/4143 | (2011.01) |
| H04N 21/422 | (2011.01) |
| H04N 21/4227 | (2011.01) |
| H04N 21/442 | (2011.01) |
| H04N 21/472 | (2011.01) |
| H04N 21/4784 | (2011.01) |
| H04N 21/43 | (2011.01) |
| H04N 21/482 | (2011.01) |
| H04L 29/06 | (2006.01) |
| H04N 21/4788 | (2011.01) |
| G06F 3/0488 | (2013.01) |
| G06F 3/14 | (2006.01) |
| H04N 21/81 | (2011.01) |
| G09G 5/12 | (2006.01) |

(52) U.S. Cl.
CPC ........ *G06F 3/0488* (2013.01); *G06F 3/04817* (2013.01); *G06F 3/04883* (2013.01); *G06F 3/1454* (2013.01); *H04L 41/22* (2013.01); *H04L 65/00* (2013.01); *H04N 21/23424* (2013.01); *H04N 21/4122* (2013.01); *H04N 21/4126* (2013.01); *H04N 21/4143* (2013.01); *H04N 21/4222* (2013.01); *H04N 21/4227* (2013.01); *H04N 21/42209* (2013.01); *H04N 21/42224* (2013.01); *H04N 21/4307* (2013.01); *H04N 21/44222* (2013.01); *H04N 21/4784* (2013.01); *H04N 21/4788* (2013.01); *H04N 21/47205* (2013.01); *H04N 21/47217* (2013.01); *H04N 21/482* (2013.01); *G06F 3/1423* (2013.01); *G06F 2203/04803* (2013.01); *G09G 5/12* (2013.01); *G09G 2354/00* (2013.01); *H04N 21/812* (2013.01)

(56) References Cited

OTHER PUBLICATIONS

Sky.com, Jun. 24, 2013, British Sky Broadcasting Group PLC and Sky International AG, <http://www.sky.com/mysky/latestnews/article/my-sky-updates/2012-07/sky-plus-app-on-ipad/>.

SmartView Tiling User Guide, Savant Systems LLC, Jan. 2014, pp. 1-25.

Residential Systems, Inc. "Savant Video Tiling from Residential Systems, Inc.." Video, youtube.com, published Dec. 26, 2013, <http://www.youtube.com/watch?v=20JWj5IJSIQ>.

RAVe Publications, "ISE 2014: Savant Systems Displays SmartView Video Tiling Interface," youtube.com, published Feb. 6, 2014, <http://www.youtube.com/watch?v=XN80MOrlnJ4>.

DSI Entertainment Systems, "Crestron control of a high-end custom home theater design in Los Angeles," youtube.com, published Dec. 14, 2010, <http://www.youtube.com/watch?v=zq4KVo7XRUE>.

Christian, Josh, "Four Images On One Screen!—Make Your Home Theater More Versatile," posted Sep. 2, 2010, <http://blog.dsientertainment.com/audio-video-home-theater-automation/bid/29732/Four-Images-On-One-Screen-Make-Your-Home-Theater-More-Versatile>.

* cited by examiner

US 9,686,581 B2

SECOND-SCREEN TV BRIDGE

RELATED APPLICATIONS

This application claims priority to U.S. Provisional Patent Application No. 61/901,383, filed on Nov. 7, 2013, the content of which is incorporated herein by reference in its entirety.

TECHNICAL FIELD

The present technology pertains to outputting video content on a primary display, and more specifically pertains to navigation on a second-screen device with the effects of the navigation being shown on the primary display.

BACKGROUND

Current technology is allowing a user to watch a primary display, such as a television, while using a second-screen device, such as a tablet or a smart phone, to interact with the primary display. As such interactions are becoming more popular, television viewers are using the second-screen devices to find out what is on television and/or using the second-screen devices for searches, queries, sharing media content related to the content on the television and other interactions on the second-screen devices. However, the primary displays and second-screen devices typically do not interact and more specifically do not share a visual connection between the two devices. For example, a user sits in front of the television with the tablet on his or her lap and uses an application to find information related to a channel or program. If the application is related to what is on the television, the user has to make the connection between the two devices. For example, the user has to watch and/or listen to the television and interact with the second-screen device.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings.

DESCRIPTION

Figure 1:
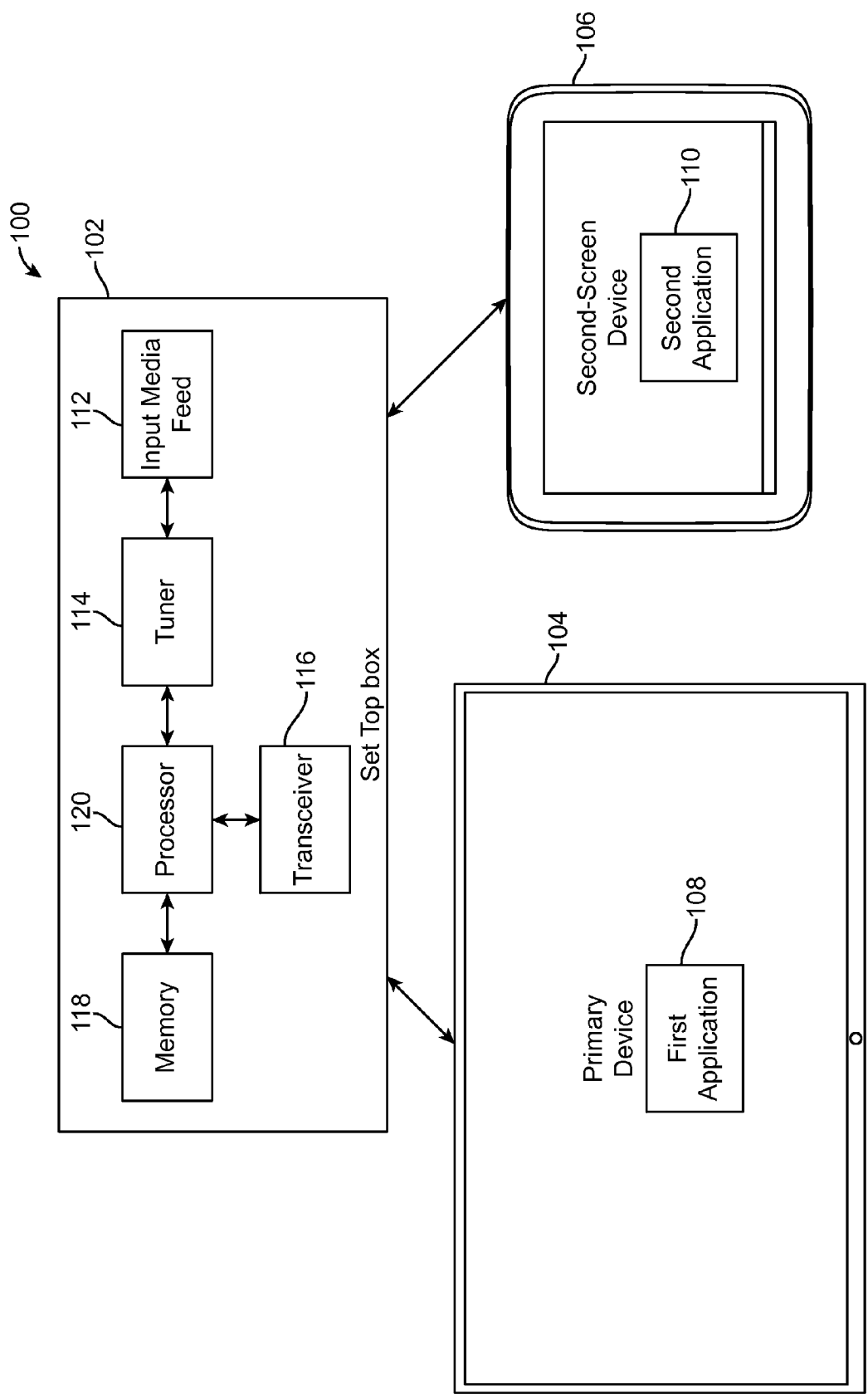
FIG. 1 illustrates a block diagram of a TV bridge system in accordance with an exemplary embodiment.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview: Disclosed are systems, methods, and non-transitory computer-readable storage media for providing coordinated graphical user interfaces on a plurality of devices. A set top box can output first media content to a primary display, such as a television. A first application on the primary display can display a video stream associated with the first media content. The set top box can output second media content to a second-screen device, such as a tablet. A second application on the second-screen device can display a video stream associated with the second media content. The video stream of the second media content can be displayed in a video display area on the second-screen device. The video stream of the first media content and the video stream of the second media content can be associated with the same content and can be substantially synchronized. The second application can receive user gestures on a touchscreen of the second-screen device to control the video stream displayed on the primary display. For example, the gestures can include next channel up, next channel down, up peek, down peek, pause, play, fast forward and rewind. More specifically, gestures on the second-screen device can alter the displayed video stream on the primary display and/or can alter the displayed video stream on the second-screen device. As a result, the second-screen device acts as a bridge to affect the displayed video stream on the primary display.

The disclosed technology addresses the need in the art for a user to interact with a second-screen device that is coordinated with the content displayed on a primary display to control a video stream on a primary display and/or a video stream on a second-screen device. More specifically, a user is able to enter commands on a touchscreen of the second-screen device to control the video stream being displayed on the primary device. In addition, the second-screen device displays at least a partial video stream that is associated with the same content and can be substantially synchronized with the video stream that is displayed on the primary display. As a result, there is a visual connection between the primary display and the second-screen device with the entered gestures on the second-screen device being reflected on the primary display and/or the second-screen device. By having the results of the entered command on the second-screen device, the user can look at the second-screen device and know that the entered command was executed without having to go back and forth between the primary display and the second-screen device.

As used herein the term "configured" shall be considered to interchangeably be used to refer to configured and configurable, unless the term "configurable" is explicitly used to distinguish from "configured." As used herein the term "transceiver" can mean a single device comprising a transmitter and receiver or can mean a separate transmitter and a separate receiver. The proper understanding of the term will be apparent to persons of ordinary skill in the art in the context in which the term is used.

Referring to FIG. 1, a block diagram of a TV bridge system in accordance with an exemplary embodiment is illustrated. As shown, the TV bridge system 100 can include a set top box 102, a primary display 104 and a second-screen device 106. Although FIG. 1 only shows one instance of the second-screen device 106, the system 100 can include one or more second-screen devices 106. The set top box 102 can receive media content and can output first media content to the primary display 104 and second media content to the second-screen device 106. The first media content and the second media content can be the same media content or can be different media content. The media content, first media content and second media content can include one or more of a video stream, an audio stream and non-video content.

The primary display 104 can be a television, a smart television, or any other device that is capable of receiving and displaying media content. The primary display 104 can display the video stream and/or non-video content on a screen associated with the primary display 104. The primary display 104 can play the audio stream on one or more speakers associated with the primary display 104. The primary display 104 can include a first application 108 configured to receive and output the first media content. In some embodiments, the first application 108 can decode the received first media content. The first application 108 can be configured to output one or more of the video stream, audio stream and the non-video content. For example, a processor (not shown) in the primary display 104 can run the first application 108 and generate output for the primary display 104.

The second-screen device 106 can be a touchscreen device, such as a tablet, a smart phone, a laptop computer or any other device capable of receiving and displaying media content. The second-screen device 106 can display one or more of the video stream, video streams and non-video content on a touchscreen of the second-screen device 106. The second-screen device 106 can play the audio stream on one or more speakers associated with the second-screen device 106. In some embodiments, the second-screen device 106 can play a different audio stream compared to the audio stream played on the primary display 104. For example, the audio stream played on the second-screen device can be in a different language or can be an audio description, which can also be known as video description or visual description. The second-screen device 106 can receive inputs, such as navigational input, via the touchscreen. The second-screen device 106 can include a second application 110 configured to receive and output the second media content. In some embodiments, the second application 110 can decode the received second media content. The second application 110 can be configured to output one or more of the video stream, audio stream and the non-video content. For example, a processor (not shown) in the second-screen device 106 can run the second application and generate output for the second-screen device 106.

The primary display 104 and second-screen device 106 can be communicatively coupled to the set top box 102. For example, the primary display 104 can be communicatively coupled to the set top box 102 via a cable and/or wirelessly. For example, the second-screen device 106 can be communicatively coupled to the set top box 102 via a cable and/or wirelessly. The cable can be an HDMI cable or any other suitable coupler for providing media content between the two devices. The wireless connection can be Bluetooth, Wi-Fi, or any other suitable wireless communication means for providing media content between the two devices.

As shown, the set top box 102 can include an input media feed 112, a tuner 114, a transceiver 116, memory 118 and a processor 120. Although FIG. 1 only shows one instance of the input media feed 112, tuner 114, transceiver 116, memory 118 and processor 120, the set top box can include one or more input media feeds 112, one or more tuners 114, one or more transceivers 116, one or more memories 118 and/or one or more processors 122. The set top box 102 is shown as a standalone device but can comprise one or more devices and/or can be integral with one or more devices. For example, the set top box 102 can be integrated into a television, such as a smart television. The set top box 102 can be a standalone device, a computer, a smart television or any other device capable of receiving media content and outputting two or more media streams. The input media feed 112 can receive media content from a media source. The media source can be a cable provider, satellite provider, internet provider, cloud provider, website, and/or any other entity that can provide media content to the set top box 102. In some embodiments, the media source can be a product, such as a DVD, or a device, such as a DVD player. The tuner 114 can be tuned to receive media content associated with a specific channel. The transceiver 116 can transmit media content to the primary display 104 and the second-screen device 106, can transmit one or more commands to the primary display 104 and/or second-screen device 106 and/or can receive commands from the second-screen device 106. In some embodiments, a transceiver 116 can transmit the same media content to both the primary display 104 and the second-screen device 106. In some embodiments, one or more transceivers 116 can transmit first media content to the primary display 104 and one or more transceivers 116 can transmit second media content to the second-screen device 106, with the one or more transceivers 116 being the same transceivers or different transceivers. In some embodiments, the one or more transceivers 116 can transmit the first media content and second media content as separate feeds or as a combined feed. The first media content and the second media content can be the same or can be different. The media content received from the input media feed 112 can be stored in memory 118. The processor 120 can control the media input feed 112, tuner 114, transceiver 116 and memory 118. The processor 120 can cause media content to be sent to the primary display 104 and the second-screen device 106, with each of the primary display 104 and the second-screen device 106 displaying the media content. The processor 120 can substantially synchronize the media content displayed on the primary display 104 and the second-screen device 106.

Figure 2A:
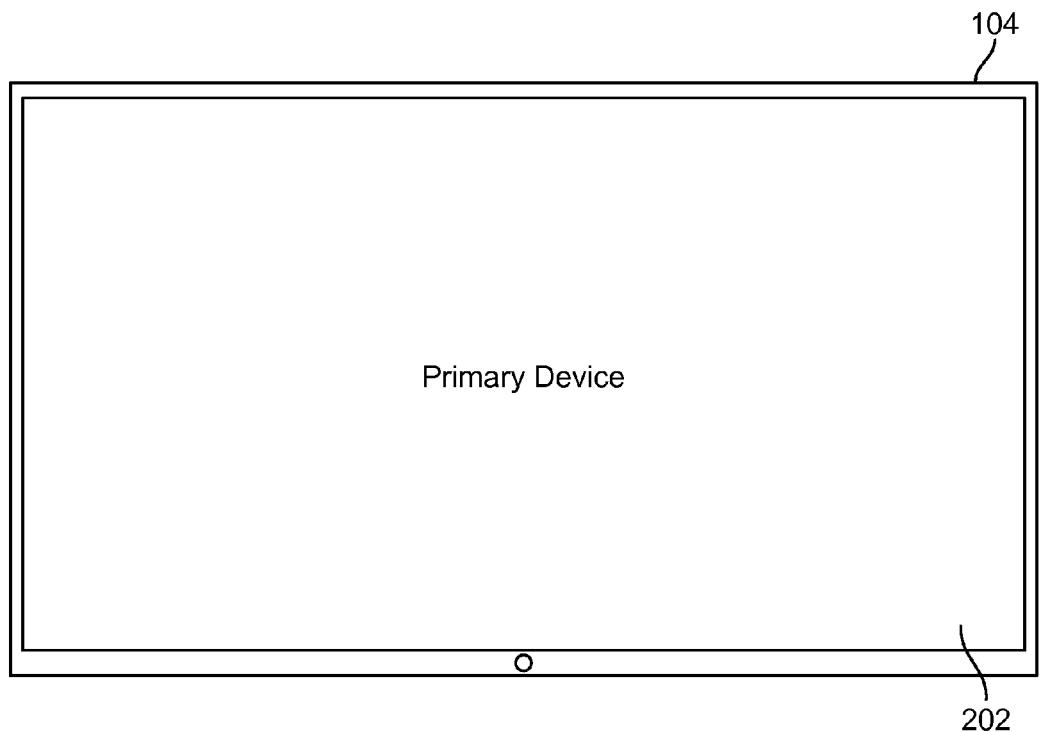
FIG. 2A illustrates a block diagram of a primary display and a second-screen device of a TV bridge system in accordance with an exemplary embodiment.
Figure 2A:
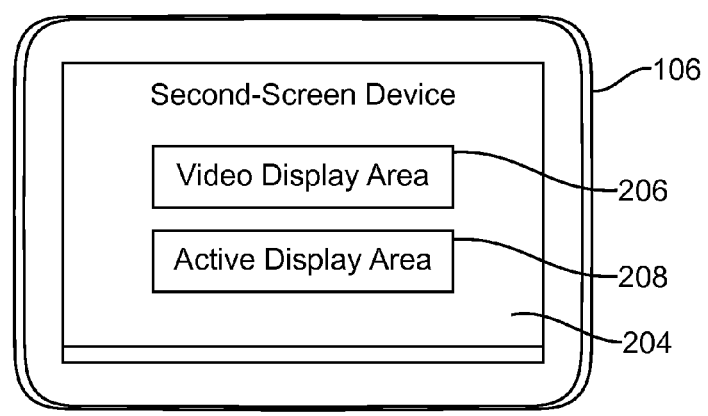

Referring to FIG. 2A, a block diagram of a primary display and a second-screen device of a TV bridge system in accordance with an exemplary embodiment is illustrated. A screen 202 of a primary display 104 can display the received media content and a touchscreen 204 of a second-screen device 204 can display the received media content. The screen 202 can display a video stream of the first media content and/or non-video content of the first media content. More specifically, the first application can cause the video stream of the first media content and/or the non-video content of the first media content to be displayed on the screen 202. For example, the primary display 104 can be a television displaying the video stream of the first media content on a screen 202 of the television.

Figure 2B:
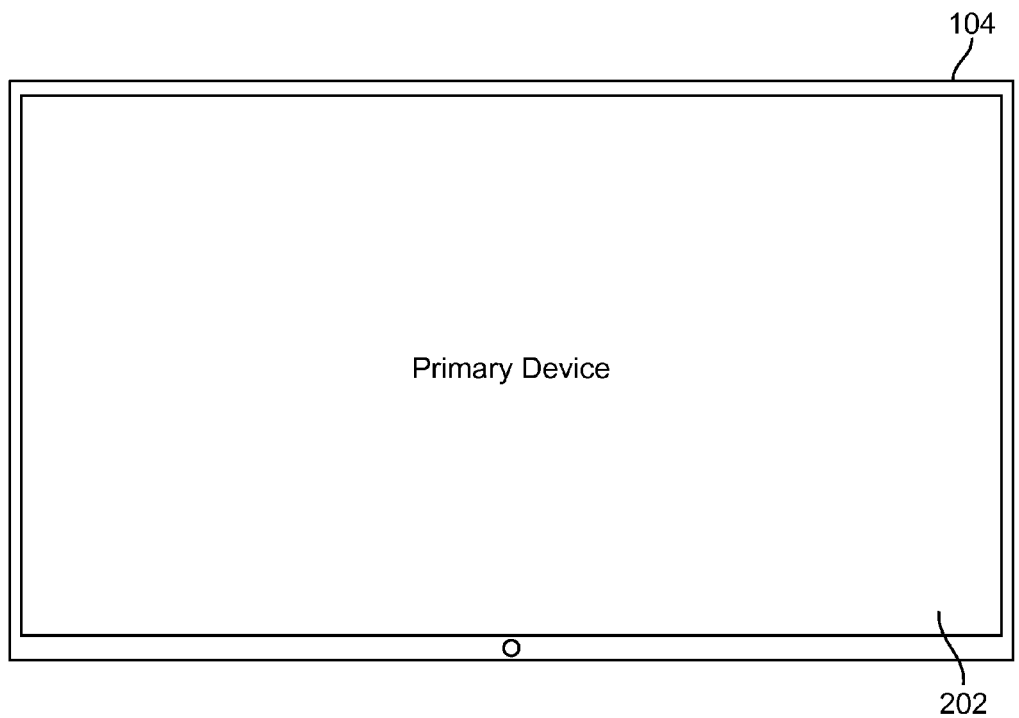
FIG. 2B illustrates a block diagram of a primary display and a second-screen device of a TV bridge system in accordance with an alternative exemplary embodiment.
Figure 2B:
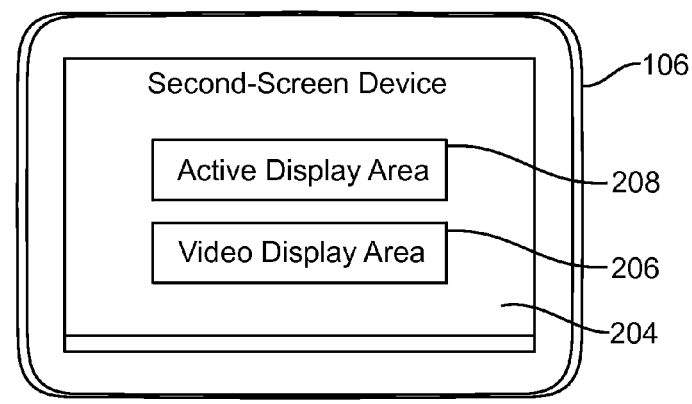
Figure 2C:
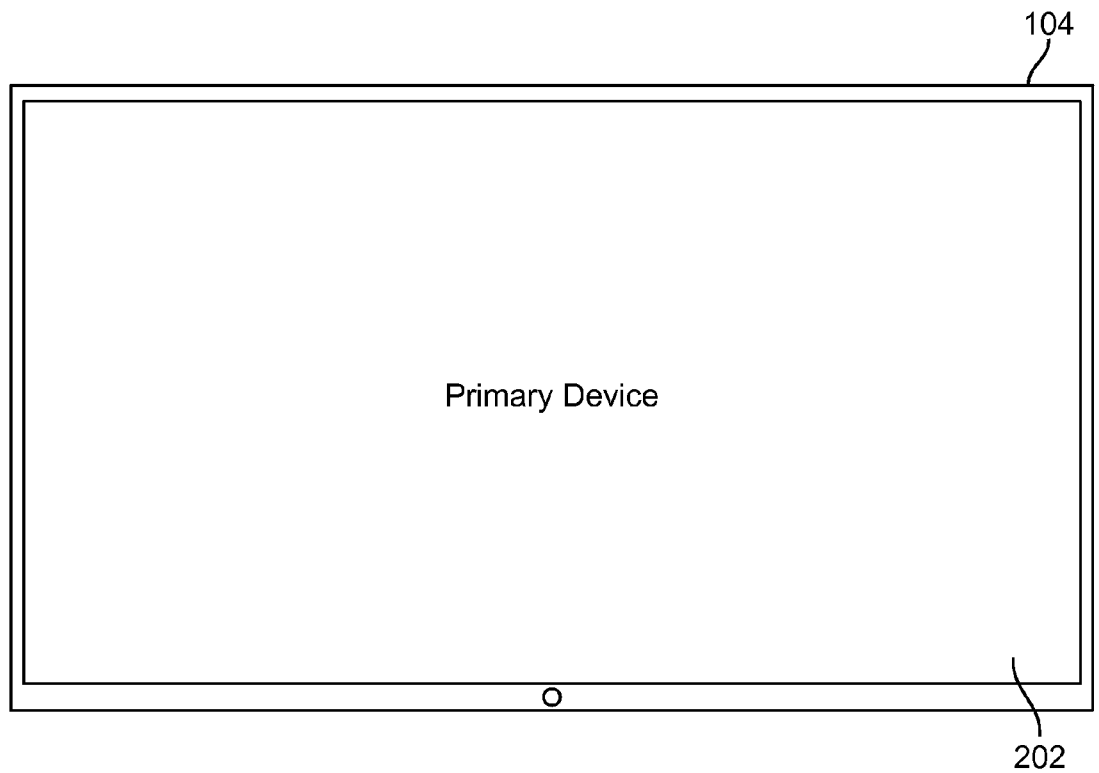
FIG. 2C illustrates a block diagram of a primary display and a second-screen device of a TV bridge system in accordance with another alternative exemplary embodiment.
Figure 2C:
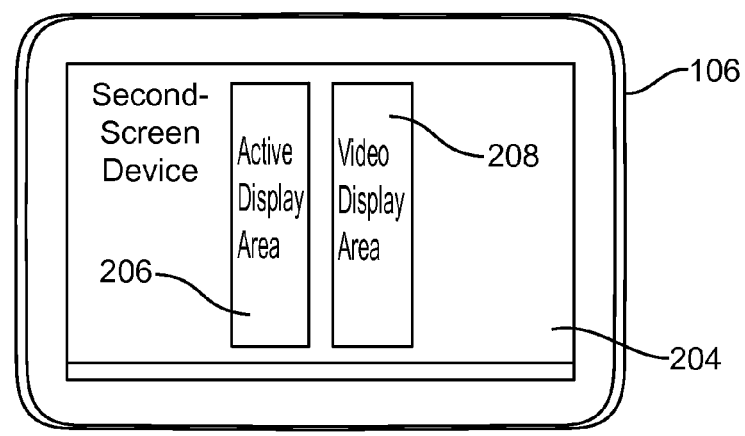

The touchscreen 204 can display a video stream of the second media content and/or non-video content of the second media stream. More specifically, the second application can cause the video stream of the second media content and/or the non-video content of the second media content to be displayed on the touchscreen 204. For example, the second-screen device 106 can be a tablet displaying part of the video stream of the second media content in a video display area 206 on the touchscreen 204 and/or can display the non-video content of the second media content in an active display area 208 on the touchscreen 204. As shown, the video display area 206 and the active display area 208 can each be limited in size, for example, less than full screen. The video display area 206 can display the video stream of the second media content and/or can display the non-video content of the media content. The active display area 208 can display non-video content of the second media content. The active display area 208 can display non-video content associated with the second media content or other media content. For example, the non-video content can be information associated with video stream, such as a listing of cast members of a television show being displayed on the primary display 104 and the second-screen device 106. In some embodiments, the other media content can be media content not associated with the second media content. For example, the other media content can be information associated with a television show not being displayed on the primary display 104 and the second-screen device 106. As shown, the video display area 206 can be displayed near the top of the touchscreen 204 and the active display area 208 can be displayed below the active display area 208. In some embodiments, the video display area 206 and active display area 208 can located in other locations on the second-screen device 206, such as switched as shown in FIG. 2B or side by side as shown in FIG. 2C. In some embodiments, the user can adjust the size of the video display area 206 and/or the active display area 208.

The set top box can transmit the first media content to the primary display 104 and can transmit the second media content to the second-screen device 106. More specifically, one or more transceivers 116 can transmit the first media content to the primary display 104 and can transmit the second media content to the second-screen device 106. In some embodiments, one or more transceivers 116 can be dedicated to only transmit first media content to one or more primary displays 204 and one or more transceivers 116 can be dedicated to only transmit second media content to one or more second-screen devices 106. In some embodiments, one or more transceivers 116 can transmit first media content and second media content to one or more primary displays 204 and to one or more second-screen devices 106.

The video stream being displayed on the screen 202 and the video stream being displayed on the touchscreen 204 can be associated with the same content and can be substantially synchronized. Synchronization of the video stream being displayed on the screen 202 and the video stream being displayed on the touchscreen 204 can be accomplished using various known techniques or methodologies. In some embodiments, the processor 120 of the set top box 102 can synchronize the video stream for the primary display 104 and the video stream for the second-screen device 106. In such embodiments, the set top box 102 can act as a master and the primary device 104 and the second-screen device 106 can be slaves in a master-slave relationship. For example, the processor 120 can send, via one or more transceivers 116, the first media content and the second media content at the same time, so that the primary device 204 displays the video stream of the first media content and the second-screen device 106 display the video stream of the second media content at about the same time, so the two video streams are substantially synchronized. In another example, the processor 120 can send, via one or more transceivers 116, time coded segments of the video streams in a coordinated manner. For example, the processor 120 can send, via one or more transceivers 116, a stream of video streams that are time coded in some ways, such as continuous streams (e.g., a broadcast) or fragmented streams (e.g., internet streamed content). In such embodiments, both the primary display 104 and the second-screen device 106 can have their playback position, such as the timecode of a given frame, coordinated such that both the primary display 104 and the second-screen device 106 are displaying the same video frames substantially at the same time. In such embodiments, the set-top box 102 can control the synchronization. In addition, the primary display 104 and the second-screen device 106 are able to maintain the temporal synchronization through normal playback and trick modes (such as skipping for playback at speeds other than normal playback).

In some embodiments, the primary display 104 and the second-screen device 106 can access the content directly from the internet, with the set top box 102 having little to no involvement. In embodiments having set-top box 102 involvement, the set top box 102 can act as a master and the primary device 104 and the second-screen device 106 can be slaves in a master-slave relationship. In embodiments having no set-top box 102 involvement, the primary display 104 can act as a master and the second-screen device 106 can act as a slave. In such arrangements, the media content provided by the primary display 104 to the second-screen device 106 can use simple and low latency encoding over a connection, such as WiFi with the video content can be temporally or spatially down sampled to minimize required bandwidth. As a result, the displayed video content on the second-screen device 106 can be substantially synchronized with the displayed video content on the primary device 104. In other embodiments having no set-top box 102 involvement, the second-screen device 106 can act as a master and the primary display 104 can act as a slave. In yet other embodiments, the functionalities described above with respect to the set-top box 102, can be performed by a different entity, such as cloud computing.

The video display area 206 can serve as a bridge between the primary display 104 and the second-screen device 106. The video display area 206 can be used to enter commands to control the video stream being displayed on the primary display 104. In response to the touchscreen 204 sensing a gesture, the second-screen device 106 can send a command to the set top box 102. In response to receiving the command, the set top box 102 can respond to the received command. For some commands, the set top box 102 can respond by sending a corresponding command to the primary display 104 causing the primary display 104 to execute the command thereby affecting the media content being displayed on the screen 202. For other commands, the set top box 102 can respond by changing and/or altering the media content being sent to the primary display 104 and/or the second-screen device 106. The active display area 208 can be used to enter commands to control the video stream being displayed on the second-screen device 106 as explained below.

Figure 3:
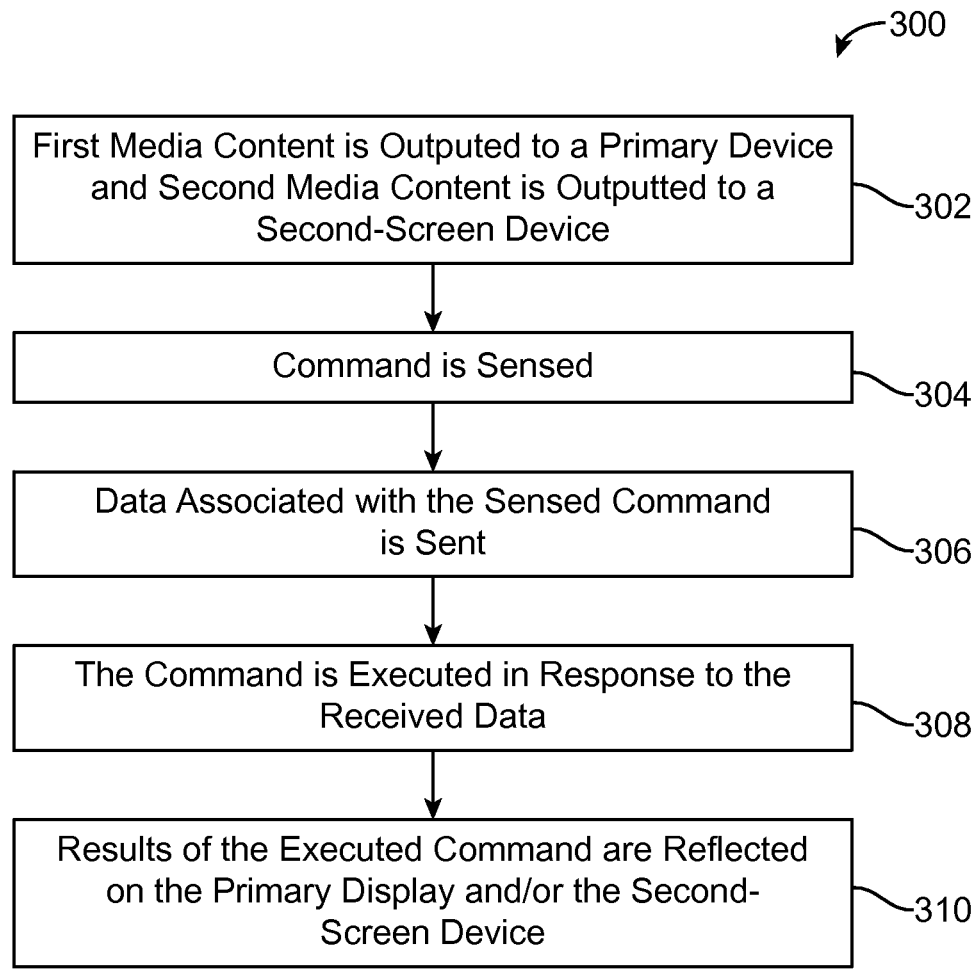
FIG. 3 illustrates a flowchart for executing a command in accordance with an exemplary embodiment.

Referring to FIG. 3, a flowchart for executing a command in accordance with an exemplary embodiment is illustrated. The exemplary method 300 is provided by way of example, as there are a variety of ways to carry out the method. The method 300 described below can be carried out using the configurations illustrated in FIGS. 1 and 2 by way of example, and various elements of these figures are referenced in explaining exemplary method 300. Each block shown in FIG. 3 represents one or more processes, methods or subroutines, carried out in the exemplary method 300. The exemplary method 300 can begin at block 302.

At block 302, first media content is outputted to a primary display and second media content is outputted to a second-screen device. For example, the set top box 102 outputs, via one or more transceivers 116, first media content to the primary display 104 and second media content to the second-screen device 106. A first application 108 on the primary device 104 causes a video stream associated with the received first media content to be displayed on the screen 202 of the primary device 104. A second application 110 on the second-screen device 106 causes a video stream associated with the received second media content to be displayed on the touchscreen 204 of the second-screen device 106. After outputting the first media content and the second media content, the method 300 can proceed to block 304.

Figure 4:
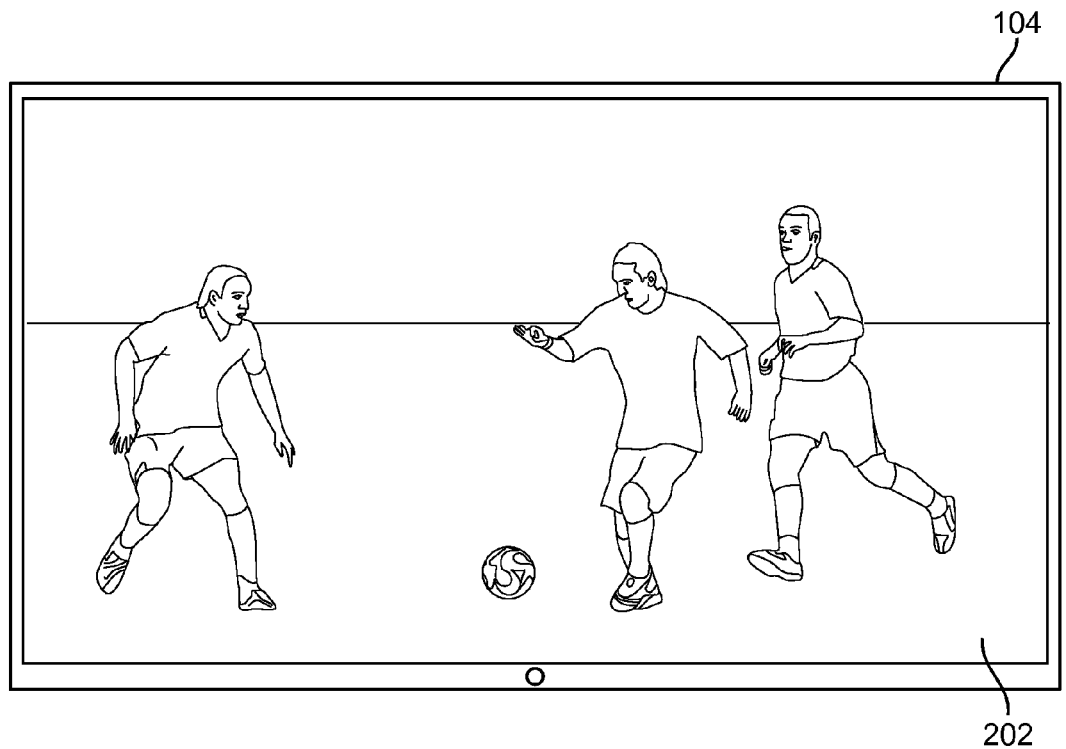
FIG. 4 illustrates screenshots of the primary device and the second-screen device displaying video streams from a currently tuned channel in accordance with an exemplary embodiment.
Figure 4:
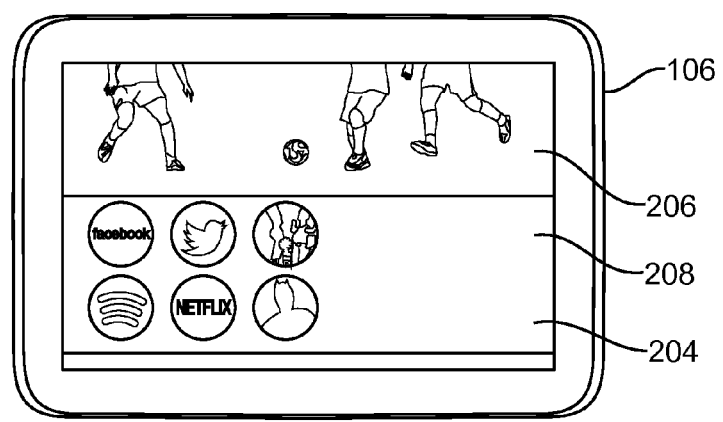

Referring to FIG. 4, screenshots of a screen and touchscreen in accordance with an exemplary embodiment are illustrated. As shown, the video stream associated with the received first media content is displayed on the screen 202 of the primary device 104 and the video stream associated with the second media content is displayed on the touchscreen 204 of the second-screen device 106. More specifically, the second application 110 displays part of the video stream associated with the second media content in a video display area 206. The first video stream 214 displayed on the screen 202 and the partial video stream 216 displayed on the touchscreen 204 can be associated with the same video content and can be substantially synchronized. As shown, the video stream displayed on the primary display 104 and the partial video stream displayed on the second-screen device 106 are associated with the same video content and are substantially synchronized. More specifically, the displayed video streams are for a soccer game with the primary device 104 displaying the soccer game full screen on the display 202 and the second-screen device 106 displaying part of the soccer game, for example, the bottom part, in the video display area 206 of the touchscreen 204. As shown, icons for launching applications can be displayed in the active display area 208 of the touchscreen 204.

Returning to FIG. 3, at block 304, a command is sensed. For example, the touchscreen 204 can sense one or more gestures for a command entered by a user. In some embodiments, the touchscreen 204 can sense one or more gestures entered by the user in the video display area 206 and/or the active display area 208. In some embodiments, the command can be sensed when the touchscreen 204 is displaying the video stream in full screen mode. The commands can include, but are not limited to, a peek command (such as an up peek command or a down peek command), a change channel command (such as channel up command or a channel down command), a pause command, a resume command, an adjustment command (such as a fast forward command or a rewind command), full screen command or tear to unlock command.

After a gesture for a command is sensed, the method 300 can proceed to block 306.

At block 306, data associated with the sensed command is sent. For example, the second-screen device 106 can send, via a transceiver, data associated with a partial or full command to the set top box 102. In some embodiments, the data associated with the sensed command can be the touch data. The touch data can be the data associated with the gesture. For example, the data associated with the command gesture can include one or more of the following: coordinates of the original touch, coordinates of the last touch, the time from the original touch to the last touch, and whether the touch is maintained or released. The touch data can be sent in one or more messages. The data associated with the sensed command can include time data, such as how long the gesture was made. After the data associated with the sensed command is sent, the method 300 can proceed to block 308.

At block 308, the command is executed in response to the received data associated with the sensed command. For example, the processor 120 of the set top box 102 can receive, via a transceiver 116, the data associated with the sensed command and can execute the sensed command. In response to receiving the data associated with the sensed command, the processor 120 can determine the sensed command based on the received data and can execute the sensed command. After executing the command in response to the received data, the method 300 can proceed to block 310.

At block 310, the results of the executed command can be reflected on the primary device and/or on the second-screen device. For example, the processor 120 can change the first media content being sent to the primary display 104 and/or the second media content being sent to the second-screen device 106. Below, each of the commands are described in further detail and one or more of the blocks of method 300 are described with more detail.

Figure 5:
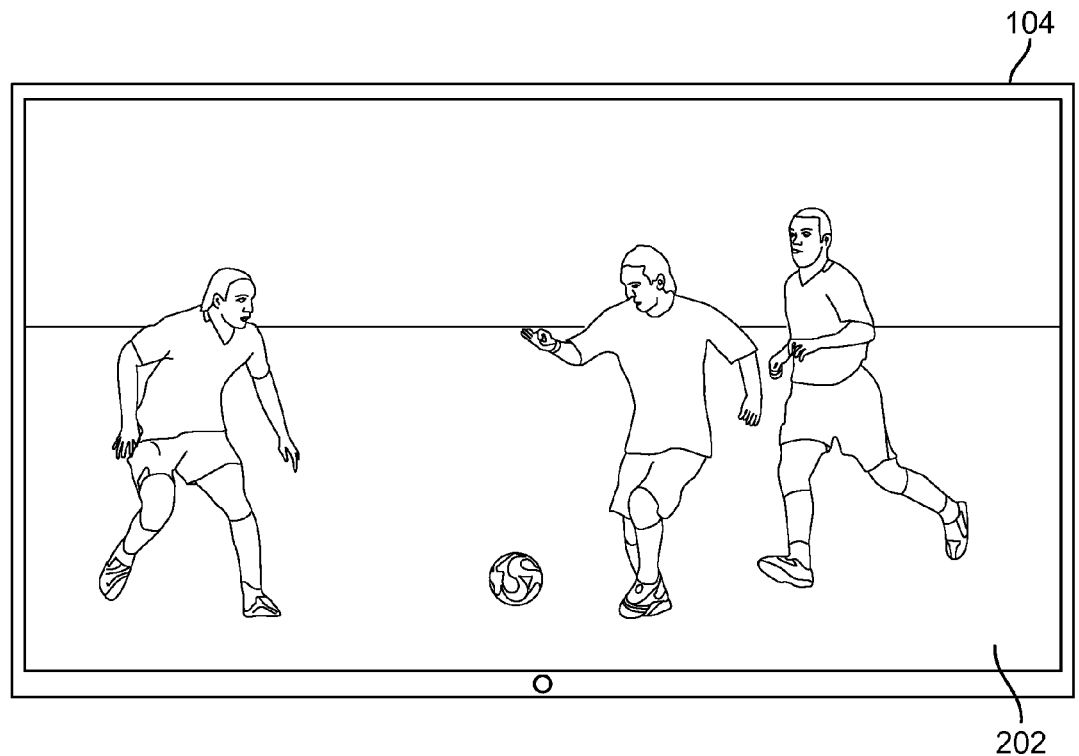
FIG. 5 illustrates screenshots of the primary device and the second-screen device for a peek command gesture in accordance with an exemplary embodiment.
Figure 5:
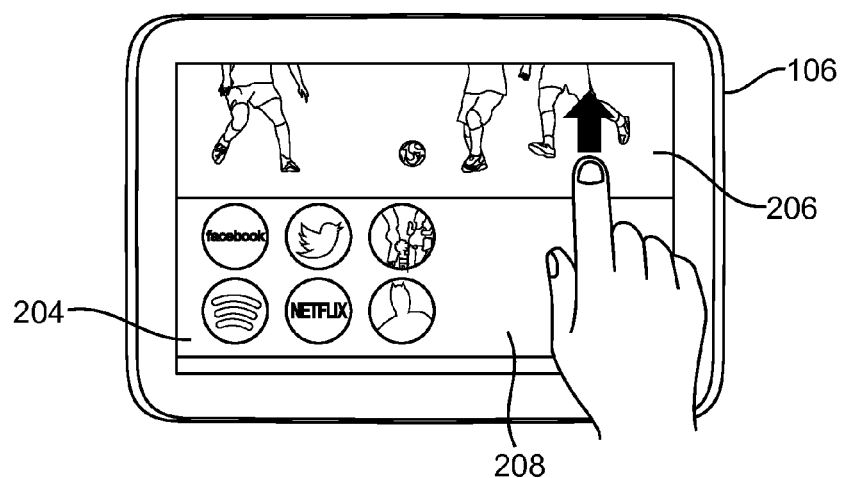

Regarding a peek up command, the sensed gesture at block 304 can comprise an upward gesture starting in the video display area 206, continuing vertically upward in the video display area 206 and maintaining the touch in the video display area 206 as shown in FIG. 5. For a peek down command, the sensed gesture at block 304 can comprise a downward gesture starting in the video display area 206, continuing vertically downward in the video display area 206 and maintaining the touch in the video display area 206. As a result of the sensed gesture, the data associated with the sensed gesture can be sent at block 306. In response to the receiving the data associated with the sensed command, the set top box 102 can execute the command at block 308. For a peek up command or peek down command, the processor 120 of the set top box 102 can execute the command by causing a tuner 114 to tune to the desired channel, such as the next available channel up from the current tuned channel for a peek up command or the next available channel down for a peek down command from the current tuned channel. In some embodiments, for a peek down command, the tuner 114 can tune to the immediate previously viewed channel. After tuning to the desired channel, the processor 120 can send the media content associated with the new tuned channel to the primary display 104 for display and to the second-screen device 106 for display at block 308. More specifically, the processor 120 can send the media content for the current channel and the media content for the desired channel, such as the next channel up from the current channel, the next channel down from the current channel or the immediate previously viewed channel. The results of the executed peek up or peek down command can be reflected on the primary device 204 and/or on the second-screen device 106 at block 208.

For a peek up command, the video stream displayed on top can be the tuned channel and the video stream displayed on bottom can be the newly tuned channel and for a peek down command, the video stream displayed on top can be the newly tuned channel and the video stream displayed on bottom can the tuned channel. In other embodiments, the two video streams can be displayed in other manners, for example, vice versa or side by side. The percentage of each video stream being displayed can be in accordance with the distance from the original touch to the last touch. In response to the user moving the user's finger in the opposite direction, the percentage of each video stream being displayed can be reflected accordingly. For example, the two video streams can be scrolled up and down with the percentages of each changing accordingly. In some embodiments, a peek distance threshold can be used to set the percentage of each displayed video stream at fifty-fifty (50%/50%). For example, the processor 120 can compare the distance traveled from the first touch to the last sensed touch to a peek distance threshold and in the event the distance traveled is not less than the peek distance threshold, the percentage of each displayed video stream can be set to fifty-fifty (50%/50%). For distances below the threshold, the percentage can be in accordance with the traveled distance. For example, if the distanced traveled is ten percent (10%) of the peek distance threshold, the percentages can be ten percent and ninety percent (10%/90%), if the distanced traveled is twenty percent (20%) of the peek distance threshold, the percentages can be twenty percent and eighty percent (20%/80%), etc. The percentages can change in response to the user moving the user's finger up or down with the percentages corresponding to the distance traveled from the original touch.

In response to the user releasing the user's touch on the touchscreen 204 prior to reaching the change channel distance threshold (discussed below), the peek up command or peek down command can end. As a result of the peek up or peek down command ending, the results can be reflected on the primary device 204 and/or on the second-screen device 106 at block 208 with the percentage of the video stream of the media content associated with the tuned channel increasing and the video steam of the media content associated with the newly tuned channel decreasing until the video stream associated with the tuned channel reaches one hundred percent (100%) of the screen 202 of the primary display 104 and of the video display are 208 of the second-screen device 106. In some embodiments, the percentages of the displayed video streams can change quicker in response to an end peek up or end peek down command compared to how the percentages of the displayed video streams change in response to a peek up command or peek down command. By changing the percentages of the displayed video streams quickly, the video stream of the media content associated with the tuned channel can appear to slam or push the video stream of the media content associated with the newly tuned channel.

Figure 6:
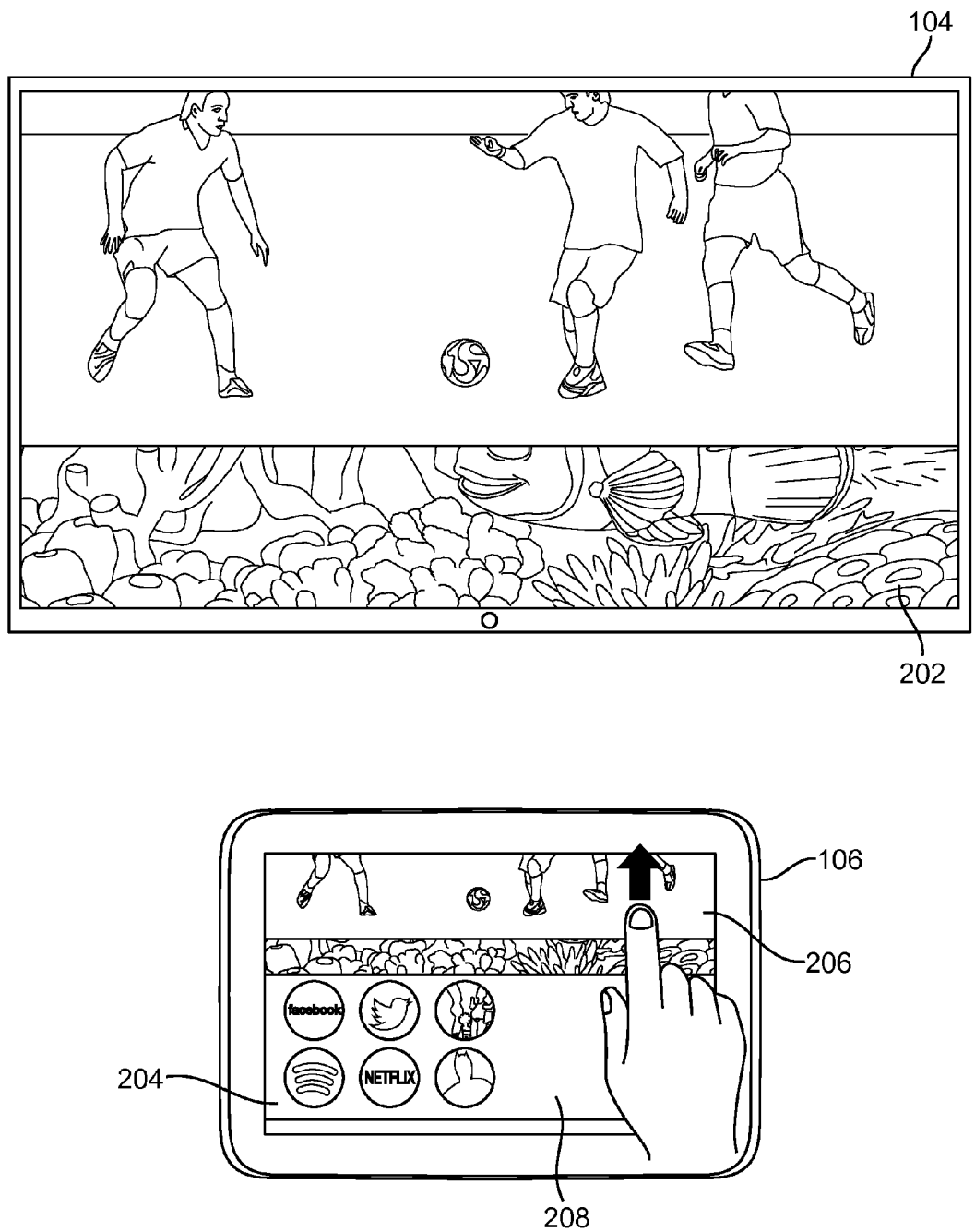
FIG. 6 illustrates screenshots of the primary device and the second-screen device for a peek command that is less than 50%/50% in accordance with an exemplary embodiment.

Referring to FIG. 6, screenshots of the primary device and the second-screen device for a peek command that is less than 50%/50% in accordance with an exemplary embodiment are illustrated. As shown, the primary device 204 and the second-screen device 106 display the video stream associated with the current channel and the video stream associated with the newly tuned channel. For example, for a peek up command, the video stream displayed on top is the video stream of the tuned channel and the video stream displayed below is the video stream of the newly tuned channel and for a peek down command the video streams can be the opposite. More specifically, the video stream displayed on top is for a soccer game and the video stream on bottom is for the Finding Nemo movie. The displayed streams are for a distance that is below the peek distance threshold.

Figure 7:
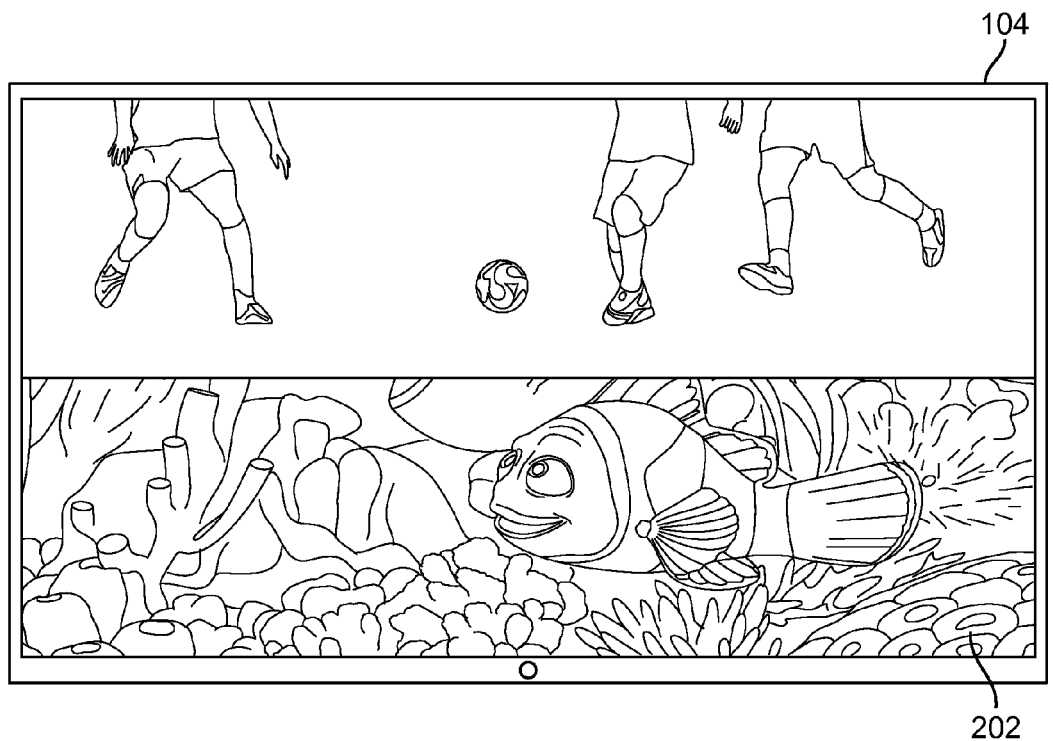
FIG. 7 illustrates screenshots of the primary device and the second-screen device for a peek command that is 50%/50% in accordance with an exemplary embodiment are illustrated.
Figure 7:
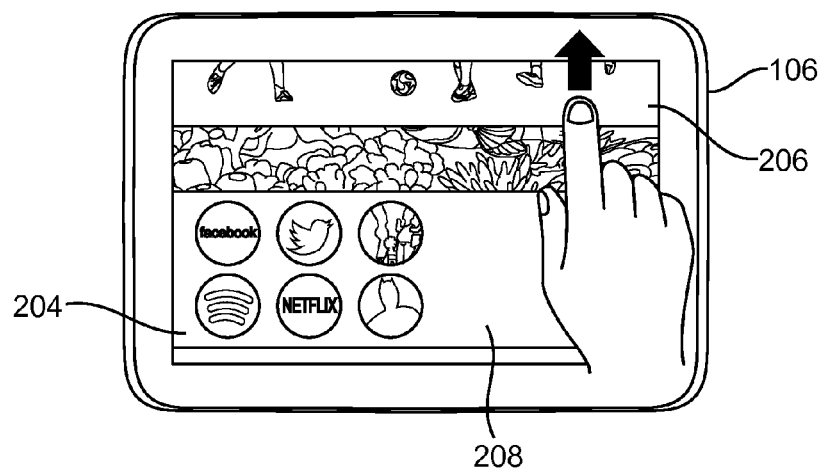

Referring to FIG. 7, screenshots of the primary device and the second-screen device for a peek command that is 50%/50% in accordance with an exemplary embodiment are illustrated. As shown, the primary device 204 and the second-screen device 106 display the video stream associated with the current channel and the video stream associated with the newly tuned channel. For example, for a peek up command, the video stream displayed on top is the video stream of the tuned channel and the video stream displayed below is the video stream of the newly tuned channel and for a peek down command the video streams can be the opposite. More specifically, the video stream displayed on top is for a soccer game and the video stream on bottom is for the Finding Nemo movie. The displayed streams are for a distance that is not less than the peek distance threshold.

Figure 8:
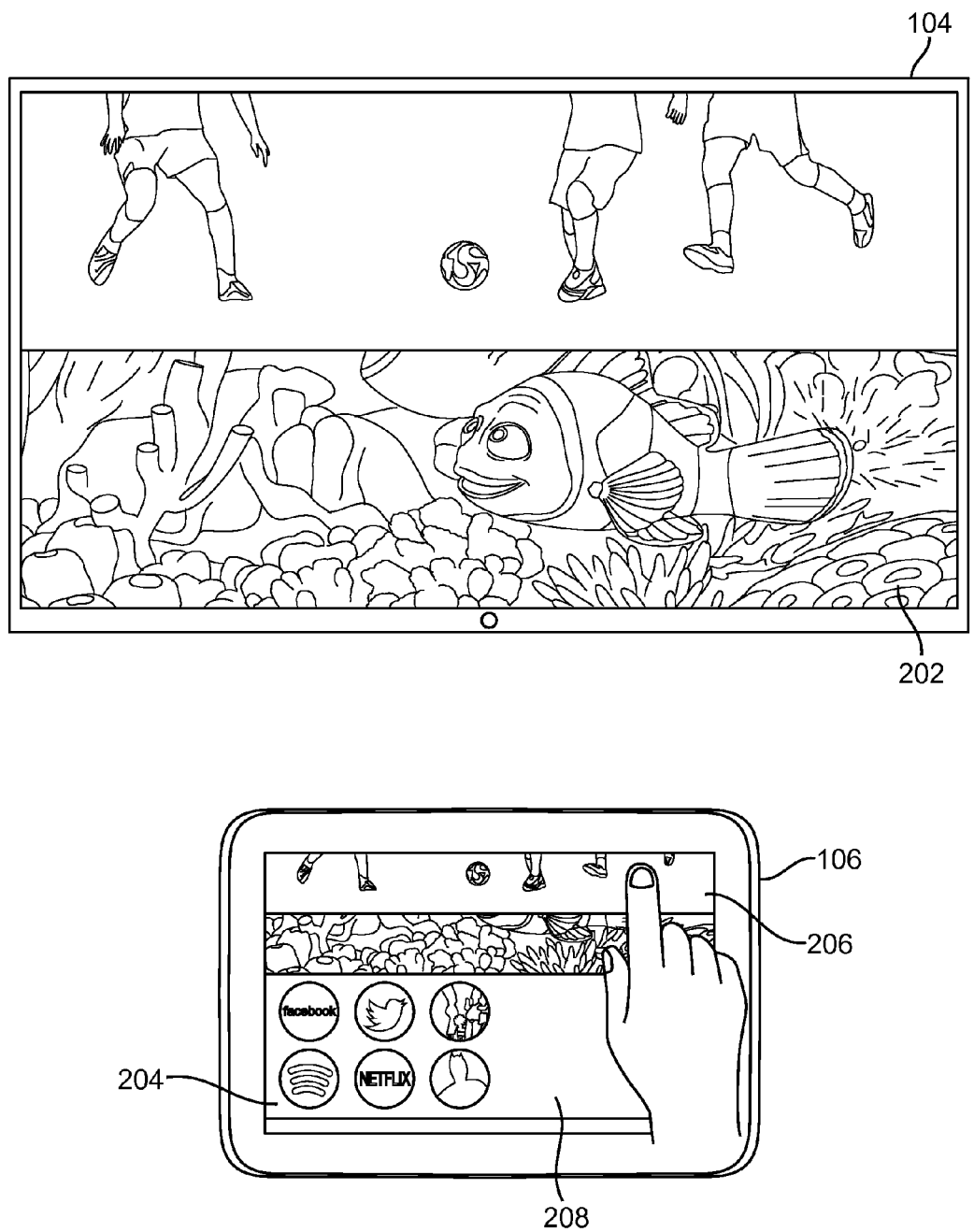
FIG. 8 illustrates screenshots of the primary device and the second-screen device for an up channel command gesture in accordance with an exemplary embodiment.

Regarding a channel up command, the sensed gesture at block 304 can comprise an upward gesture starting in the video display area 206, continuing vertically upward in the video display area 206 and being released in the video display area 206 as shown in FIG. 8. For a channel down command, the sensed gesture at block 304 can comprise a downward gesture starting in the video display area 206, continuing vertically downward in the video display area 206 and being released in the video display area 206. As a result of the sensed gesture, the data associated with the sensed gesture can be sent at block 306. In response to the receiving the data, the set top box 102 can execute the command at block 308. For a channel up command or channel down command, the processor 120 of the set top box 102 can execute the partial or full command by causing a tuner 114 to tune to the desired channel, such as the next available channel up from the current tuned channel for a channel up command or the next available channel down for a channel down command from the current tuned channel and can send the media content associated with the new tuned channel to the primary display 104 for display and to the second-screen device 106 for display at block 308. In some embodiments, for a channel down command, the tuner 114 can tune to the immediate previously viewed channel. The processor 120 can send the media content for the current channel and the media content for the desired channel, the next channel up from the current channel, the next channel down from the current channel or the immediate previously viewed channel. The results of the executed channel up or peek channel command can be reflected on the primary device 204 and/or on the second-screen device 106 at block 208.

For a channel up command, the video stream displayed on top can be the tuned channel and the video stream displayed on bottom can be the newly tuned channel with the video stream of the newly tuned channel moving up until it replaces the tuned or previously tuned channel. For a channel down command, the video stream displayed on the bottom can be the tuned channel and video stream displayed on top can be the newly tuned channel with the video stream of the newly tuned channel moving down until it replaces the tuned or previously tuned channel. In other embodiments, the two video streams can be displayed in other manners, for example, vice versa or side by side.

In some embodiments, a change channel distance threshold can be used. The change channel distance threshold can be different from the peek distance threshold. For example, the processor 120 can compare the distance traveled from the first touch to the last sensed touch with the change channel distance threshold. In the event the distance traveled is less than the change channel distance threshold, the sensed gesture percentage of each displayed video stream can be in accordance with the traveled distance. This can be the same as for the peak commands. For example, if the distanced traveled is ten percent (10%) of the change channel distance threshold, the percentages can be ten percent and ninety percent (10%/90%), if the distanced traveled is twenty percent (20%) of the change channel distance threshold, the percentages can be twenty percent and eighty percent (20%/80%), etc. However, in the event the traveled distance is not less than the change channel distance threshold and the user releases the user's touch on the touchscreen 204, the video stream from the newly tuned channel can continue to increase compared to the tuned channel or previously tuned channel until the video stream of the newly tuned channel is one hundred percent (100%) of the available display area of the screen 202 of the primary display 104 and (100%) of the available display area of the video display area 206 of the second-screen device 106.

Figure 9:
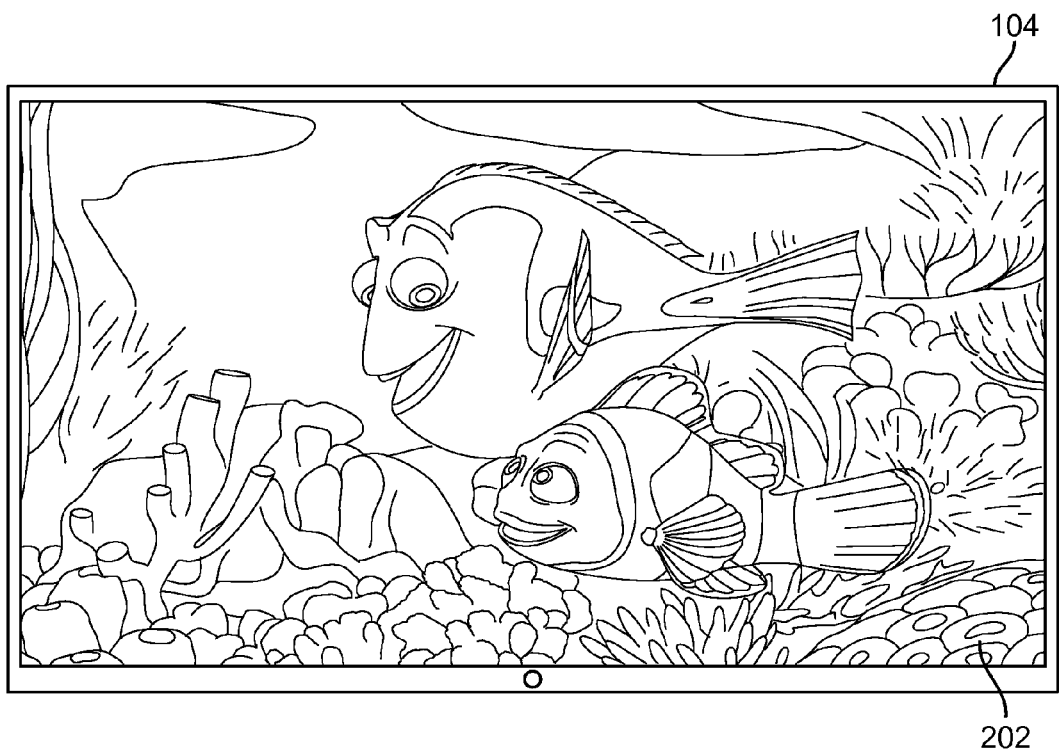
FIG. 9 illustrates screenshots of the primary device displaying a video stream and the second-screen device displaying video streams for a newly tuned channel in accordance with an exemplary embodiment.
Figure 9:
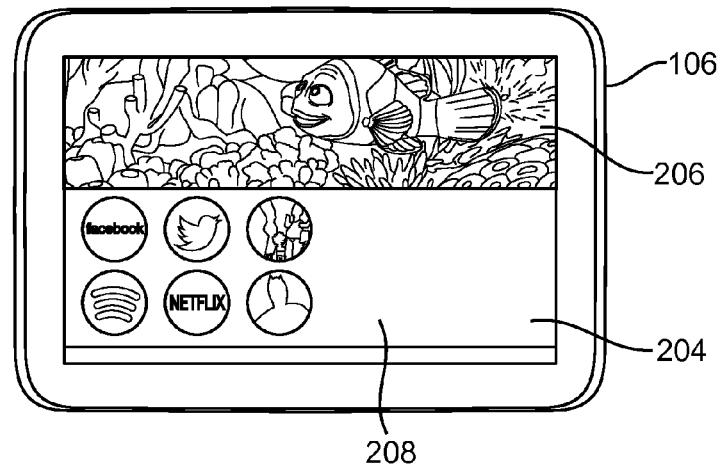

Referring to FIGS. 5-9, screenshots of the primary device and the second-screen device displaying video streams with different percentages of video streams for a currently tuned channel and a newly tuned channel in accordance with exemplary embodiments are illustrated. As shown in FIG. 5, a user is watching a currently tuned channel and enters an up channel command in the video display area 206. As shown in FIGS. 5 and 6, the percentages of the newly tuned channel increases with the video stream of the tuned channel decreasing in a similar manner as described above with respect to FIGS. 5 and 6 and the peek command. As shown in FIG. 8, the up channel command is completed. Once the change channel command is completed: the user releasing their touch from the touchscreen 204, the percentage of the display of the newly tuned channel can continue to increase until the video stream of the newly tuned channel is one hundred percent (100%) of the available display area of the screen 202 of the primary display 104 and (100%) of the available display area of the video display area 206 of the second-screen device 106 as shown in FIG. 9.

Figure 10:
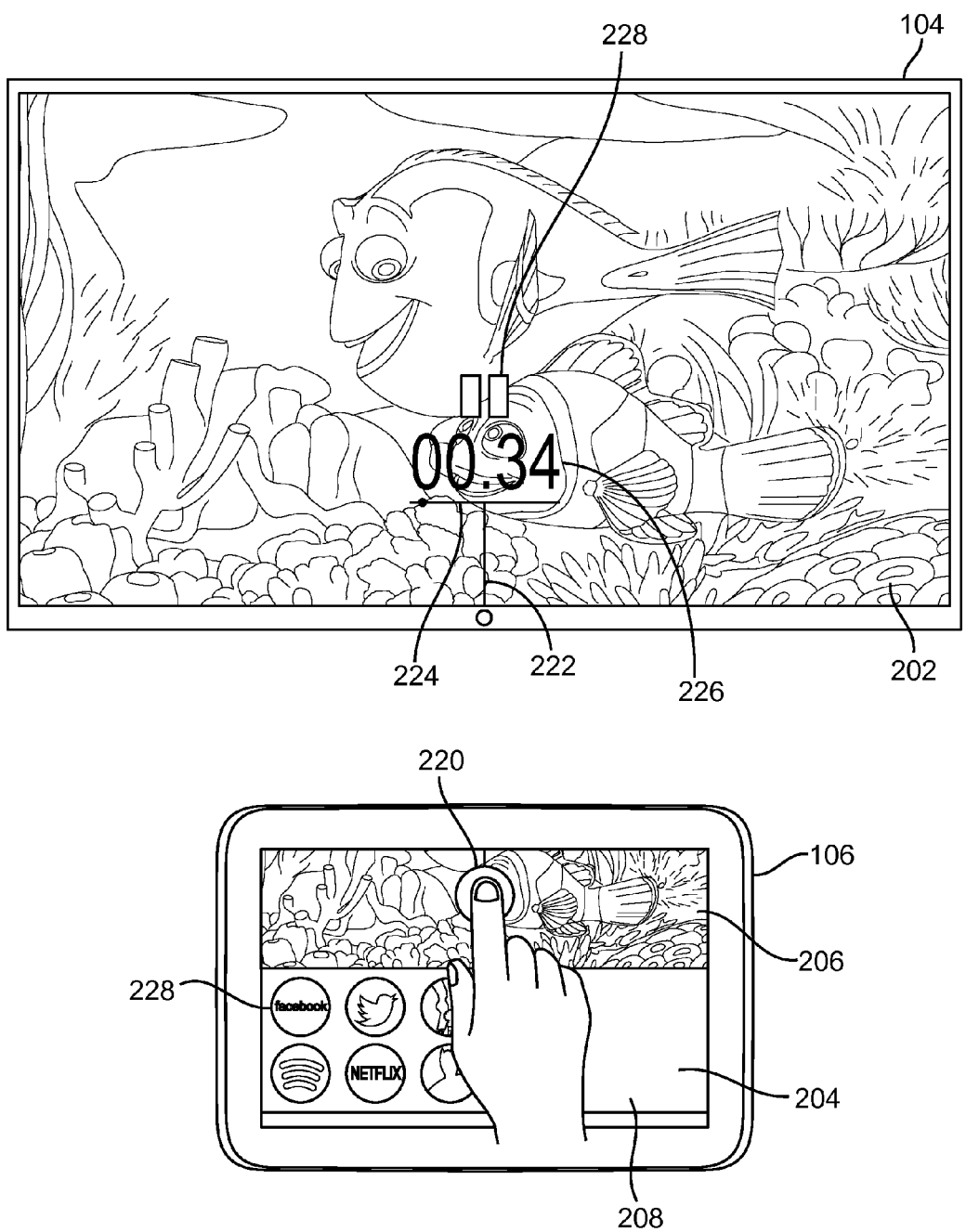
FIG. 10 illustrates screenshots of the primary device and the second-screen device for a pause command gesture in accordance with an exemplary embodiment.

Regarding a pause command, the sensed gesture at block 304 can comprise a tap in the video display area 206 of the second-screen device 106 as shown in FIG. 10. As a result of the sensed gesture, the data associated with the sensed gesture can be sent at block 306. For example, the data associated with the sensed gesture can include the location or coordinates of the tap. In response to the receiving the sensed gesture, the set top box 102 can execute the pause command at block 308. For example, the processor 120 can stop sending the media content to the primary display 104 and the second-screen device. The results of the executed pause command can be reflected on the primary device 204 and/or on the second-screen device 106 at block 310. For example, the last displayed frame can be maintained until another gesture is sensed. FIG. 10 shows the executed pause command with a pause icon 228 displayed on the primary display 104. A touch indicator 220 can be displayed on the second-screen device 106 where the user has touched the touchscreen 204. A line 222 can be shown on the touch indicator 220 on the second-screen device 106 and extending to the display 202 on the primary device 104. The primary device 104 can display a time scale 224 and a time stamp 226 showing where the pause command occurred with respect to the full video.

Figure 11:
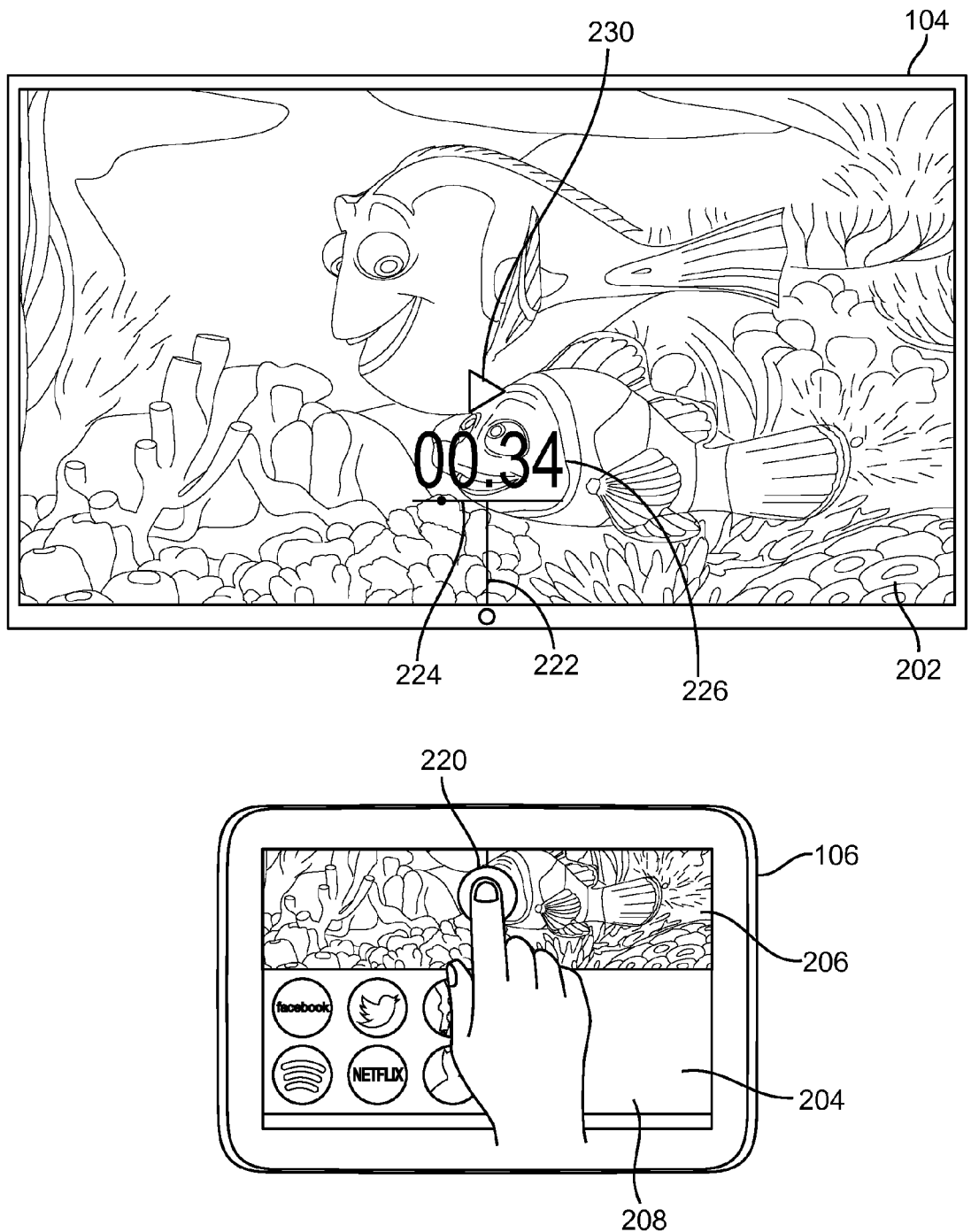
FIG. 11 illustrates screenshots of the primary device and the second-screen device for a resume command gesture in accordance with an exemplary embodiment.

Regarding a resume command, the sensed gesture at block 304 can comprise a tap in the video display area 206 of the second-screen device 106 as shown in FIG. 11. The tap would be a second tap to the pause command. As a result of the sensed gesture, the data associated with the sensed gesture can be sent at block 306. For example, the data associated with the sensed gesture can include the location or coordinates of the tap. In response to the receiving the sensed gesture, the set top box 102 can execute the resume command at block 308. For example, the processor 120 can resume sending the media content to the primary display 104 and the second-screen device. The results of the executed channel up or peek channel command can be reflected on the primary device 204 and/or on the second-screen device 106 at block 310. For example, the video streams associated with the received media streams can be displayed on the screen 202 of the primary device 204 and/or on the touchscreen 204 of the second-screen device 106. FIG. 11 shows the executed resume command with a resume icon 230 displayed on the primary display 104. The primary device 104 can display a time scale 224 and a time stamp 226 showing where the resume command occurred with respect to the full video.

Figure 12:
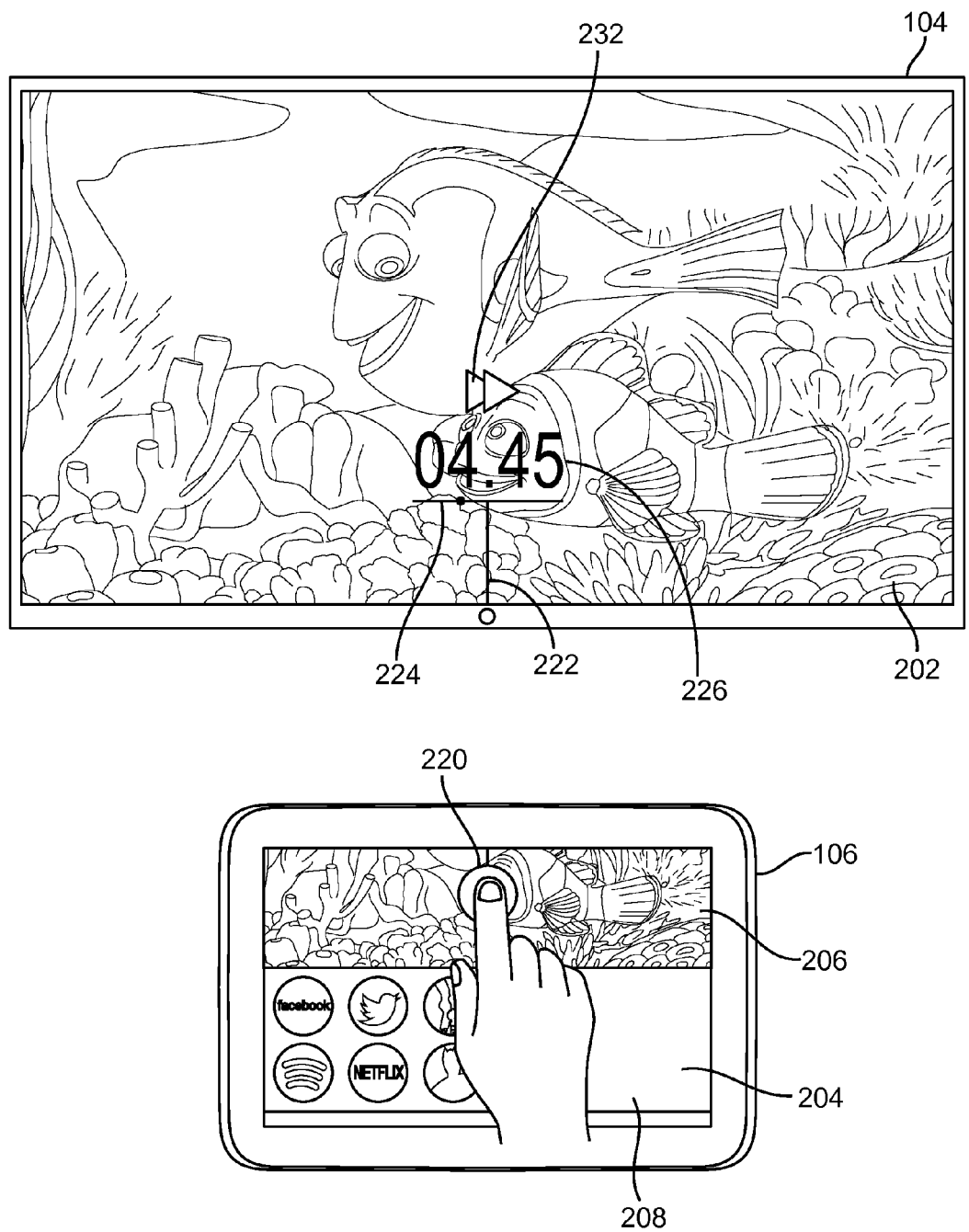
FIG. 12 illustrates screenshots of the primary device and the second-screen device for a fast forward command gesture in accordance with an exemplary embodiment.
Figure 13:
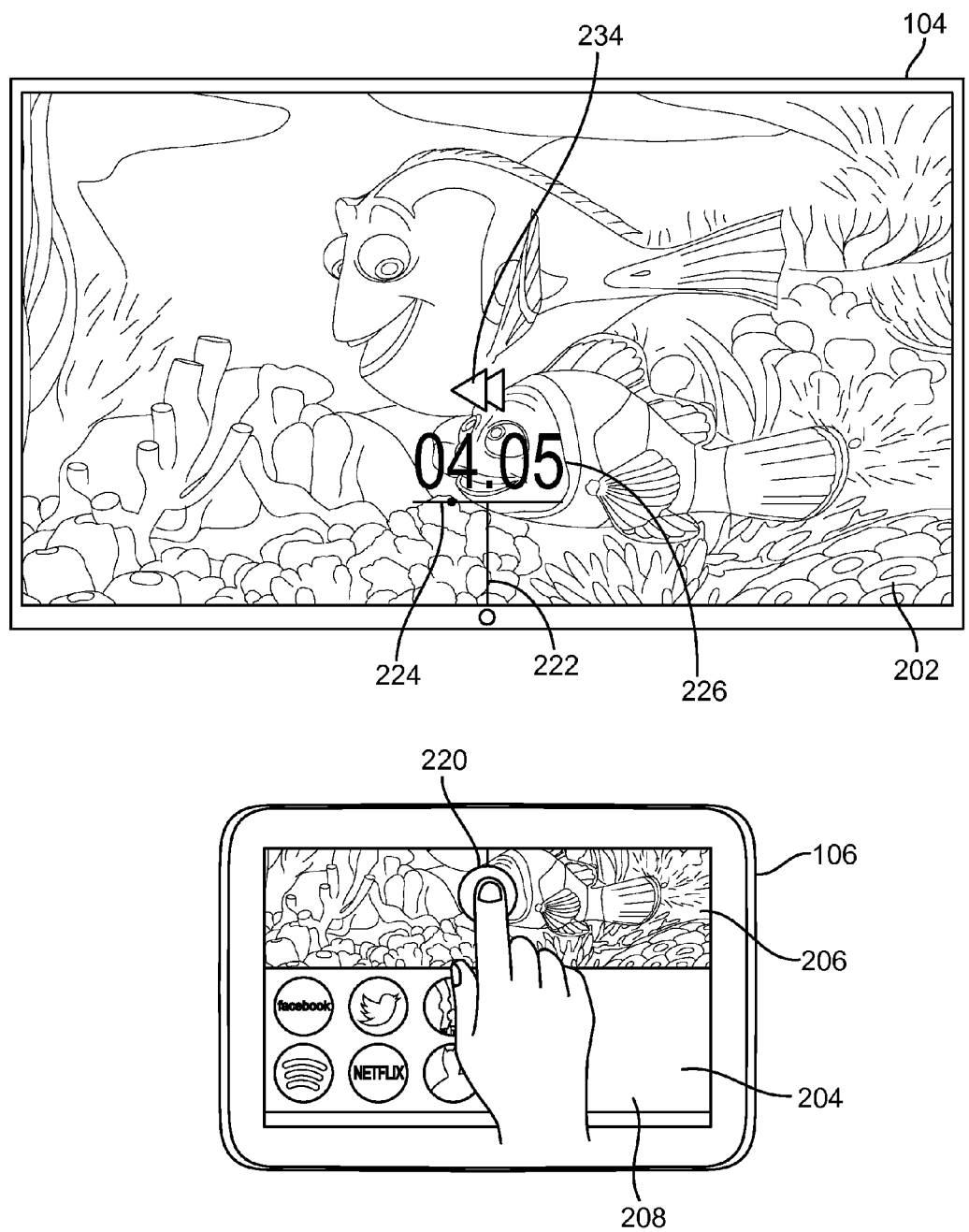
FIG. 13 illustrates screenshots of the primary device and the second-screen device for a rewind command gesture in accordance with an exemplary embodiment.

Regarding adjustment commands, such as a fast forward command or a rewind command, the processor 120 can execute the command by adjusting the video stream of the first media content and the video stream second media content being displayed by a time factor for as long as the user's touch on the screen is maintained. A fast forward command can be a touch in the video display area 206, continuing laterally to the right for a predetermined distance of the video display area 206 and being maintained in the video display area 206 as shown in FIG. 12. A rewind command can be a touch in the video display area 206, continuing laterally to the left for a predetermined distance of the video display area 206 and being maintained in the video display area 206 as shown in FIG. 13. The distance between the original touch and the end touch can adjust the video streams of the media content by a time factor accordingly. For example, a distance of ten percent (10%) of the screen width can result in a 1× fast forward, a distance of twenty percent (20%) of the screen width can result in a 2× fast forward, etc. The adjustment command can be sensed in block 304. As a result of the sensed gesture, the data associated with the sensed gesture can be sent at block 306. In response to the receiving the sensed gesture, the set top box 102 can execute the command at block 308. For example, the processor 120 can adjust the displayed video streams of the media content in accordance with the time factor and send the adjusted video streams of the media content to the primary display 104 for display and to the second-screen device 106 for display at block 308. The media content can be sent in various ways as discussed in further detail below. The results of the executed adjustment command can be reflected on the primary device 204 and/or on the second-screen device 106 at block 208. FIG. 12 shows the executed fast forward command with a fast forward icon 232 displayed on the primary display 104. The primary device 104 can display a time scale 224 and a time stamp 226 showing where the location of the video content is with respect to the full video. FIG. 13 shows the executed rewind command with a rewind icon 234 displayed on the primary display 104. The primary device 104 can display a time scale 224 and a time stamp 226 showing where the location of the video content is with respect to the full video.

In the event the received command is a fast forward command and the memory 118 does not contain stored media content, then the transmitted media content is not incremented by the time factor. In the event, the time factor is not beyond the stored media content in memory 118, the transmitted media content can be incremented by the time factor providing the time factor is not beyond the stored media content. In the event, the time factor is beyond the stored media content in memory 118, then the transmitted media content can be the media content received from the input media feed 112.

In the event the received command is a rewind command and the memory 128 does not contain stored media content, then the transmitted media content is not changed. In the event, the time factor is not beyond the stored media content in memory 128, the transmitted media content can be decremented by the time factor providing the time factor is not beyond the stored media content. In the event, the time factor is beyond the stored media content in memory 128, then the transmitted media content can be the media content stored in the memory 128 starting at the beginning of the stored media content.

Figure 14:
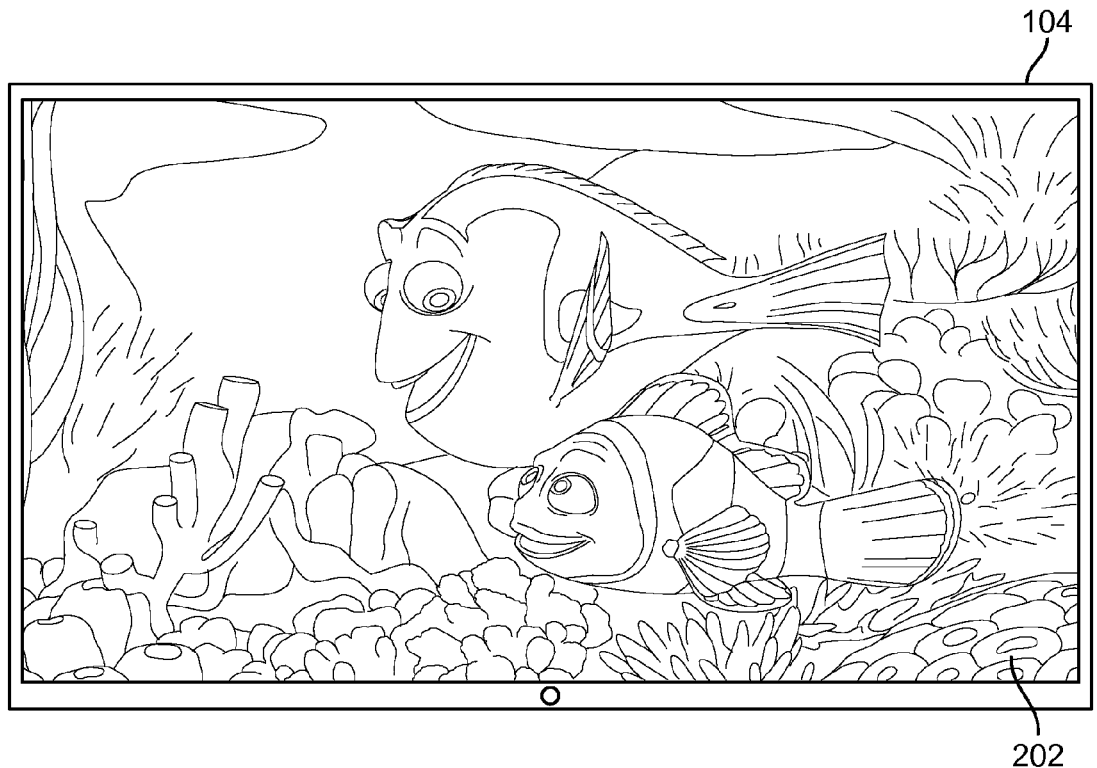
FIG. 14 illustrates screenshots of the primary device and the second-screen device for a full screen command gesture in accordance with an exemplary embodiment.
Figure 14:
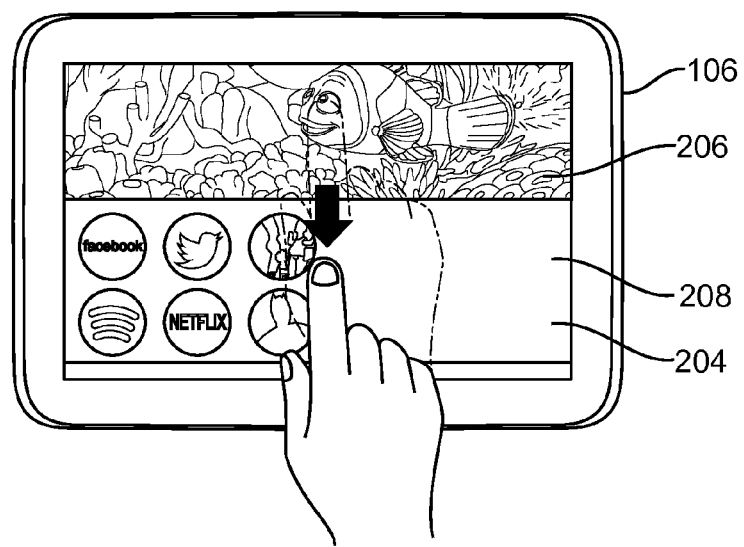

Regarding a full screen command, the processor 120 can execute the command by causing the displaying the video stream on the second-screen device 106 full screen, for example, not only in the video display area 206. For example, a full screen command can be a touch in the video display area 206, continuing to the vertically downward beyond the video display area 206 and ending in the active display area 208. The full screen command can be sensed in block 304 as shown in FIG. 14. As a result of the sensed gesture, the data associated with the sensed gesture can be sent at block 306. In response to the receiving the sensed gesture, the set top box 102 can execute the command at block 308. For example, the processor 120 can cause the display of the displayed video stream of the media content on the second-screen device 106 to be full screen at block 308. The media content can be sent in various ways as discussed in further detail below. The results of the executed adjustment command can be reflected on the second-screen device 106 at block 310.

Figure 15:
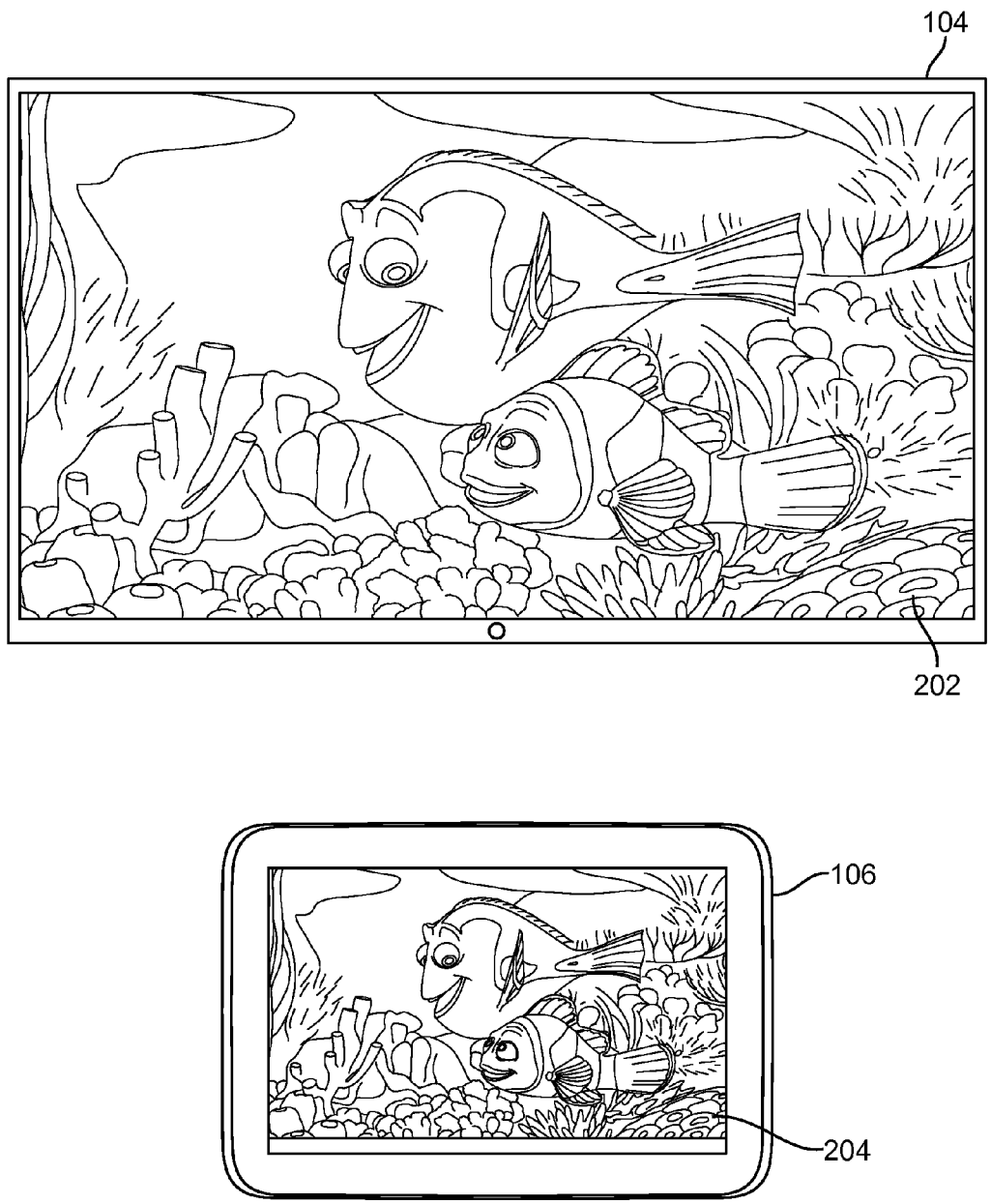
FIG. 15 illustrates screenshots of the primary device displaying a video stream and the second-screen device displaying a video stream in full screen in accordance with an exemplary embodiment.

Referring to FIG. 15, screenshots of the primary device displaying a video stream and the second-screen device displaying a video stream in full screen in accordance with an exemplary embodiment are illustrated. As shown, the video stream associated with the media content displayed on the screen 202 of the primary display 104 is shown full screen and the video stream associated with the media content displayed on the touchscreen 204 of the second-device device 310 is shown full screen.

Figure 16:
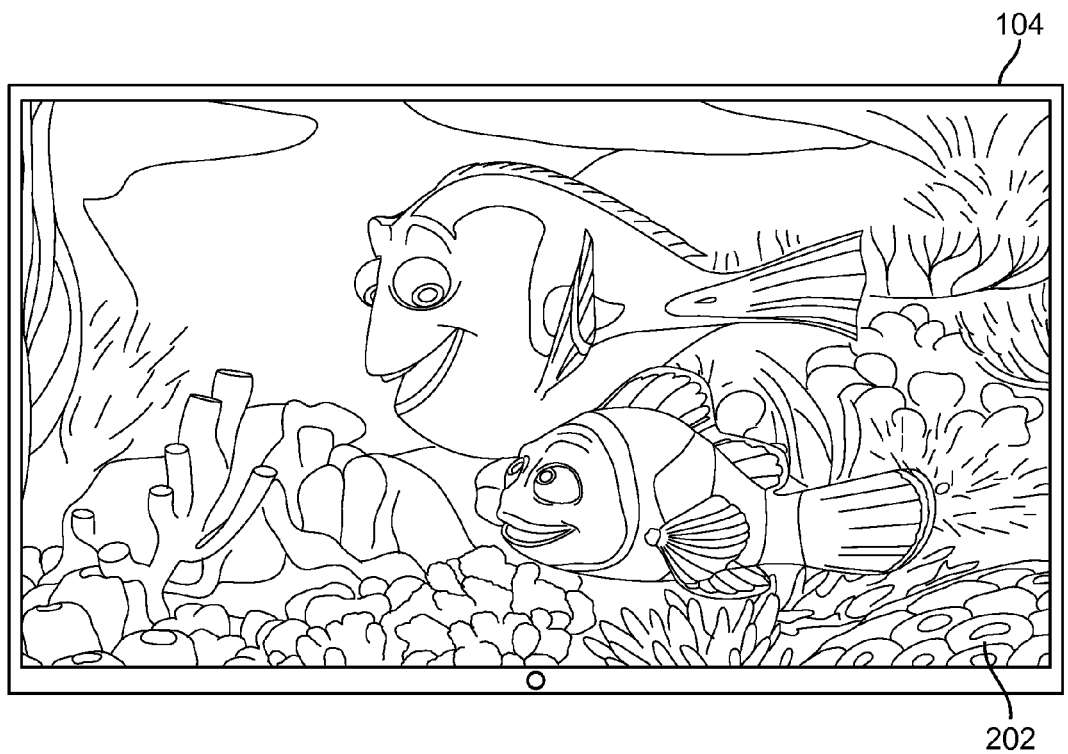
FIG. 16 illustrates screenshots of the primary device and the second-screen device for a tear to unlock command gesture in accordance with an exemplary embodiment.
Figure 16:
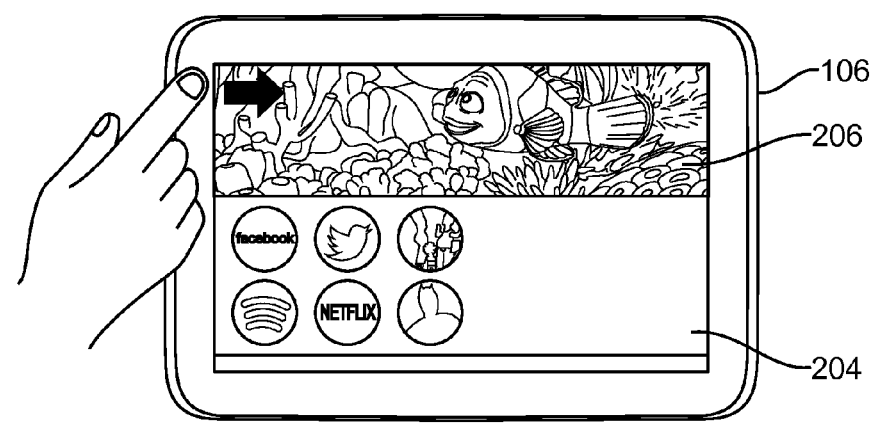

Regarding the tear to unlock command, the processor 120 can execute the command by no longer requiring the video stream of the first media content and the video stream of the second media content to be substantially synchronized. A tear to unlock gesture command can be a touch to the left of the video display area 206, continuing to the right into the video display area 206 and ending in the video display area 206 as shown in FIG. 16. The tear to unlock command can be sensed in block 304. As a result of the sensed gesture, the data associated with the sensed gesture can be sent at block 306. In response to the receiving the sensed gesture, the set top box 102 can execute the command at block 308. For example, the processor 120 can cause the display of the displayed video stream of the media content on the second-screen device 106 to be full screen at block 310 as shown in FIG. 8. As a result of the tear to unlock command being executed, the video stream of the media content displayed on the on the screen 202 of the primary display 104 is displayed full screen and the video stream associated with the media content displayed on the touchscreen 204 of the second-device device 208 is displayed full screen with the video streams no longer being required to synchronized.

The above described method 300 and commands are directed to embodiments where the second-screen device 106 is a "dumb" device which sends touch data. In some embodiments, the second screen device 208 can be a "smart" device and can interpret the sensed commands and send the "sensed command" to the set top box 102 which can execute the sensed command. For example, the second application 110 on the second-screen device 106 can sense a pause command on the touchscreen 204 and can send the sensed command to the set top box 102 which can execute the pause command. In some embodiments, the set top box 102 can receive the touch data or a sensed command and can execute the command by sending commands to the primary display 104 and/or second-screen device 106 with the first application 108 and/or the second application 110 executing the commands. In some embodiments, the second application 110 can determine the sensed command and can execute the command on the second-screen device 106. In such embodiments, the second-screen device 106 can send the touch data or the sensed command to the set top box 102 which can execute the command and have the results displayed on the primary display 104. Regardless of how the commands are executed, the user is able to enter commands via gestures on the second-screen device 106 with the set top box 102 causing the effects of the command on the primary display 104.

The processor 120 can send, via one or more transceivers 116, media content to the primary display 104 and the second-screen device 106. This can be done in various ways. In some embodiments, the processor 120 can send the same media content to both the primary display 104 and the second-screen device 106. In some embodiments, first media content can be sent to the primary display 104 and second media content can be sent to the second-screen device 106. In such embodiments, the first media content can comprise one or more video streams and one or more associated audio streams and the second media content can comprise one or more video streams, one or more associated audio streams and non-video content. The non-video content can include information associated with the one or more video stream. In other embodiments, the media content sent to the primary display 104 and/or the second-screen device 106 can include a single video stream comprising the video stream associated with the tuned channel and the video stream associated with a newly tuned channel in accordance with the command. For example, for a peek command, the single video stream can have ninety percent (90%) of the tuned channel and ten percent (10%) of the newly tuned channel with the percentage of each changing in accordance with the sensed gesture. In yet other embodiments, the media content can contain the video stream associated with the tuned channel and the video stream associated with the newly tuned channel along with instructions on how to display the video streams in accordance with the sensed gesture. For example, the media content can comprise both video streams with instructions for each application, the first application 108 and the second application 110, to display ninety percent (90%) of the tuned channel and ten percent (10%) of the newly tuned channel with the percentage of each changing in accordance with the sensed gesture. In yet another embodiment, one or more transceivers 116 can send media content comprising a video stream associated with the tuned channel, one or more transceivers can send media content comprising a video stream associated with the newly tuned channel, along with instructions on how to display the video streams in accordance with the sensed gesture. Regardless of how the media content is sent to the primary display 104 and the second-screen device 106, the primary display 104 and the second-screen device 106 display the video stream or video streams in accordance with the sensed gesture.

In some embodiments, graphic items, such as a touch indicator 220, line 222, time scale 224, time stamp 226 and an icon 228, 230, 232, 234, are displayed on the second-screen device 106 for an executed command that affects the location of the video content being displayed. These commands can include pause, resume, fast forward and rewind commands. In such embodiments, more, less and/or different graphic items can be displayed. For example, the time stamp 226 may not be displayed on the primary device 104 in response to an executed command. In other embodiments, one or more graphic items can be displayed for other executed commands, such as a peek command.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method for providing coordinated graphical user interfaces on a plurality of devices comprising:
   wirelessly outputting by a set top box a first video stream and a second video stream;
   receiving, by a primary display, the first video stream and the second video stream and rendering a full screen view of the first video stream by a first application on the primary display;
   receiving, by a second-screen device, the first video stream and the second video stream and rendering a partial view of the first video stream by a second application on the second-screen device, wherein the partial view is a cropped frame of the full screen view, and the partial view and the full screen view are substantially synchronized in time;
   receiving, on the second-screen device, a user input to display a portion of the second video stream;
   rendering, on the primary display, a full screen view comprising an overlay of the first video stream and the requested portion of the second video stream; and
   rendering, on the second-screen device, a partial view of the overlay of the first video stream and the requested portion of the second video stream, wherein the partial view consists of a cropped frame of the overlay of the first video stream and a cropped frame of the requested portion of the second video stream, and the partial view and the full screen view are substantially synchronized in time.

2. The method of claim 1 wherein the partial view is displayed in a video display area of a touchscreen of the second screen device.

3. The method of claim 2, wherein the video display area of the second screen device is an interactive area that is configured to receive the user input to display a portion of the second video stream, wherein the user input comprises touch data associated with a gesture made within the video display area of the touchscreen and the rendering on the primary display and the rendering on the second-screen device is triggered by the user input.

4. The method of claim 3 wherein the first video stream is associated with a tuned channel and the second video stream is associated with a newly tuned channel above the tuned channel, the method further comprising:
   receiving a user input to tune from the first video stream to the second video stream, wherein the user input consists of received touch data corresponding to a next channel up command; and
   rendering on the primary display and rendering on the second-screen device a percentage of the second video stream being displayed as increasing and a percentage of the first video stream being displayed as decreasing until the first video stream is no longer being displayed.

5. The method of claim 4 wherein the received touch data corresponds to an upward gesture starting in the video display area, continuing upwards in the video display area and being released in the video display area.

6. The method of claim 4, wherein the second video stream is associated with a newly tuned channel below the tuned channel, and wherein the user input consists of received touch data corresponding to a next channel down command.

7. The method of claim 6 wherein the received touch data corresponds to a downward gesture starting in the video display area, continuing downward in the video display area and being released in the video display area.

8. The method of claim 3 wherein the first video stream is associated with a tuned channel and the second video stream is associated with a newly tuned channel above the tuned channel, the method further comprising:
   receiving a user input to tune to the first video stream and the second video stream, wherein the user input consists of received touch data corresponding to a peek up command; and
   rendering on the primary display and rendering on the second-screen device a percentage of the second video stream being displayed as increasing and a percentage of the first video stream being displayed as decreasing until the first video stream and the second video stream are displayed substantially equally.

9. The method of claim 8 wherein the received touch data corresponds to an upward gesture starting in the video display area, continuing upwards in the video display area and being maintained in the video display area.

10. The method of claim 8, wherein the second video stream is associated with a newly tuned channel below the tuned channel, and wherein the user input consists of received touch data corresponding to a peek down command.

11. The method of claim 10 wherein the received touch data corresponds to an downward gesture starting in the video display area, continuing downwards in the video display area and being maintained in the video display area.

12. The method of claim 3 further comprising:
   displaying, by the first application, the last displayed frame of the video stream in response to receiving touch data corresponding to a pause command.

13. The method of claim 12 wherein the received touch data corresponds to a tap in the video display area.

14. The method of claim 12 further comprising:
   resuming, by the first application, the display of the video stream in response to receiving touch data corresponding to a resume command.

15. The method of claim 14 wherein the received touch data corresponds to a tap in the video display area.

16. The method of claim 3 further comprising:
   displaying, by the second application, the video stream on the touchscreen full screen in response to receiving touch data corresponding to a full screen command.

17. The method of claim 16 wherein the received touch data corresponds to a touch in the video display area, continuing vertically downward beyond the video display area and ending in an active display area.

18. The method of claim 3 further comprising:
   displaying, by the second application, the video stream on the touchscreen full screen and no longer being required to be substantially synchronized in response to receiving touch data corresponding to a tear to unlock command.

19. The method of claim 18 wherein the received touch data corresponds to a touch in an active display area, continuing laterally to a right side of the active display area and ending in the active display area.

20. The method of claim 1 further comprising:
   rendering non-video content and the second video stream in an active display area and the video display area, respectively, of the second-screen device, wherein the active display area and the video display area are non-overlapping.

* * * * *